US008644298B1

(12) United States Patent
Mahdi

(10) Patent No.: US 8,644,298 B1
(45) Date of Patent: Feb. 4, 2014

(54) ADDING A SERVICE CONTROL CHANNEL AFTER SESSION ESTABLISHMENT

(75) Inventor: Kaniz Mahdi, Carrollton, TX (US)

(73) Assignee: Genband US LLC, Plano, TX (US)

( * ) Notice: Subject to any disclaimer, the term of this patent is extended or adjusted under 35 U.S.C. 154(b) by 1344 days.

(21) Appl. No.: 12/209,829

(22) Filed: Sep. 12, 2008

Related U.S. Application Data

(60) Provisional application No. 60/971,621, filed on Sep. 12, 2007.

(51) Int. Cl.
H04L 12/66 (2006.01)
(52) U.S. Cl.
USPC .......................... 370/352; 370/395.2
(58) Field of Classification Search
None
See application file for complete search history.

(56) References Cited

U.S. PATENT DOCUMENTS

| 5,497,411 | A | 3/1996 | Pellerin |
| 5,970,134 | A | 10/1999 | Highland et al. |
| 5,978,367 | A * | 11/1999 | Kinnunen et al. ............ 370/337 |
| 6,067,453 | A | 5/2000 | Adiwoso et al. |
| 6,208,627 | B1 | 3/2001 | Menon et al. |
| 6,353,596 | B1 | 3/2002 | Grossglauser et al. |
| 6,614,897 | B1 | 9/2003 | Curtis et al. |
| 6,721,565 | B1 | 4/2004 | Ejzak et al. |
| 6,801,615 | B2 | 10/2004 | Stumer et al. |
| 6,961,774 | B1 | 11/2005 | Shannon et al. |
| 6,970,459 | B1 | 11/2005 | Meier |
| 6,999,770 | B2 | 2/2006 | Hirsbrunner et al. |
| 7,099,309 | B2 | 8/2006 | Davidson |
| 7,206,582 | B2 | 4/2007 | Tom et al. |
| 7,313,666 | B1 | 12/2007 | Saminda De Silva et al. |
| 7,395,065 | B2 | 7/2008 | Dorenbosch |
| 7,477,734 | B1 | 1/2009 | Smith |

(Continued)

FOREIGN PATENT DOCUMENTS

| CA | 2 501 991 A1 | 4/2004 |
| CN | 101292489 | 10/2008 |

(Continued)

OTHER PUBLICATIONS

3rd Generation Partnership Proejct (3GPP), "IP Multimedia Subsystem (IMS) Centralized Services," Jun. 2008, Technical Specification 3GPP TS 23.292 v8.0.0, Stage 2, Release 8, 3GPP Organizational Partners.

(Continued)

Primary Examiner — Gregory Sefcheck
Assistant Examiner — Daniel Mitchell
(74) Attorney, Agent, or Firm — Jenkins, Wilson, Taylor & Hunt, P.A.

(57) ABSTRACT

For an IMS session that employs a CS bearer path that supports a local user element for at least a portion of the overall bearer path, the present invention provides for establishing and using the IMS session without providing a service control signaling channel when the IMS session is initially established. After the IMS session is established and supporting communications between the local and remote user elements, a service control signaling channel for the local user element may be established and associated with the IMS session to facilitate IMS services requiring service control signaling. Before or when a service is invoked, the local user element, the network, or an agent thereof may establish the service control signaling channel wherein the IMS will associate the service control signaling channel with the current IMS session and employ service control signaling over the service control signaling channel to facilitate IMS services.

31 Claims, 13 Drawing Sheets

(56) References Cited

U.S. PATENT DOCUMENTS

| | | | |
|---|---|---|---|
| 7,492,886 B1 | 2/2009 | Kalmanek, Jr. et al. | |
| 7,664,495 B1 | 2/2010 | Bonner et al. | |
| 7,729,489 B2 | 6/2010 | Lee et al. | |
| 7,792,974 B2* | 9/2010 | Westman et al. | 709/228 |
| 8,045,568 B2 | 10/2011 | Sylvain et al. | |
| 8,180,338 B1 | 5/2012 | Sylvain | |
| 8,203,982 B2* | 6/2012 | Mutikainen et al. | 370/310 |
| 8,208,442 B2 | 6/2012 | Mahdi et al. | |
| 8,411,673 B2 | 4/2013 | Jin et al. | |
| 2001/0055982 A1 | 12/2001 | Umeda | |
| 2002/0037723 A1 | 3/2002 | Roach | |
| 2002/0133600 A1 | 9/2002 | Williams et al. | |
| 2002/0188562 A1 | 12/2002 | Igarashi et al. | |
| 2003/0027569 A1 | 2/2003 | Ejzak | |
| 2003/0105804 A1 | 6/2003 | Turner | |
| 2003/0110292 A1 | 6/2003 | Takeda et al. | |
| 2003/0148765 A1 | 8/2003 | Ma et al. | |
| 2003/0161460 A1 | 8/2003 | Dammrose | |
| 2003/0174688 A1 | 9/2003 | Ahmed et al. | |
| 2004/0002335 A1 | 1/2004 | Pan et al. | |
| 2004/0003046 A1 | 1/2004 | Grabelsky et al. | |
| 2004/0028080 A1 | 2/2004 | Samarasinghe et al. | |
| 2004/0062383 A1 | 4/2004 | Sylvain | |
| 2004/0067754 A1 | 4/2004 | Gao et al. | |
| 2004/0157600 A1 | 8/2004 | Stumpert et al. | |
| 2004/0219905 A1 | 11/2004 | Blumenthal et al. | |
| 2004/0226425 A1 | 11/2004 | Marsh et al. | |
| 2004/0246990 A1 | 12/2004 | Krishnamurthi et al. | |
| 2004/0249887 A1 | 12/2004 | Garcia-Martin et al. | |
| 2004/0264455 A1 | 12/2004 | Tao | |
| 2005/0002407 A1 | 1/2005 | Shaheen et al. | |
| 2005/0003797 A1 | 1/2005 | Baldwin | |
| 2005/0003821 A1 | 1/2005 | Sylvain | |
| 2005/0243870 A1 | 11/2005 | Balogh et al. | |
| 2005/0245261 A1 | 11/2005 | Ejzak | |
| 2005/0265304 A1 | 12/2005 | Kim et al. | |
| 2005/0286531 A1 | 12/2005 | Tuohino et al. | |
| 2006/0002355 A1 | 1/2006 | Baek et al. | |
| 2006/0002380 A1 | 1/2006 | Bollinger et al. | |
| 2006/0034270 A1 | 2/2006 | Haase et al. | |
| 2006/0035637 A1* | 2/2006 | Westman | 455/435.3 |
| 2006/0077965 A1 | 4/2006 | Garcia-Martin et al. | |
| 2006/0083199 A1 | 4/2006 | Yang | |
| 2006/0087982 A1* | 4/2006 | Kuure et al. | 370/252 |
| 2006/0094431 A1 | 5/2006 | Saifullah et al. | |
| 2006/0111114 A1 | 5/2006 | Marin et al. | |
| 2006/0142004 A1 | 6/2006 | He et al. | |
| 2006/0142010 A1 | 6/2006 | Tom | |
| 2006/0187904 A1 | 8/2006 | Oouchi | |
| 2006/0198360 A1 | 9/2006 | Biage et al. | |
| 2006/0209805 A1 | 9/2006 | Mahdi | |
| 2006/0217112 A1 | 9/2006 | Mo | |
| 2006/0268925 A1 | 11/2006 | Barzegar et al. | |
| 2007/0004415 A1 | 1/2007 | Abedi | |
| 2007/0014281 A1 | 1/2007 | Kant | |
| 2007/0041367 A1 | 2/2007 | Mahdi | |
| 2007/0058788 A1 | 3/2007 | Mahdi et al. | |
| 2007/0066304 A1 | 3/2007 | Lee | |
| 2007/0070982 A1 | 3/2007 | Croak | |
| 2007/0072605 A1 | 3/2007 | Poczo | |
| 2007/0100981 A1 | 5/2007 | Adamczyk et al. | |
| 2007/0127436 A1 | 6/2007 | Karimi-Cherkandi et al. | |
| 2007/0153736 A1 | 7/2007 | Mow et al. | |
| 2007/0206568 A1 | 9/2007 | Silver et al. | |
| 2007/0263599 A1 | 11/2007 | Itzkovitz et al. | |
| 2008/0025263 A1 | 1/2008 | Pelkonen | |
| 2008/0037533 A1 | 2/2008 | Wah et al. | |
| 2008/0049725 A1* | 2/2008 | Rasanen | 370/352 |
| 2008/0144518 A1 | 6/2008 | Rosenwald et al. | |
| 2008/0144637 A1 | 6/2008 | Sylvain et al. | |
| 2008/0151870 A1 | 6/2008 | Stucker et al. | |
| 2008/0160991 A1 | 7/2008 | Constantinof et al. | |
| 2008/0268818 A1 | 10/2008 | Keller et al. | |
| 2008/0299980 A1* | 12/2008 | Buckley et al. | 455/445 |
| 2009/0111471 A1 | 4/2009 | Li et al. | |
| 2009/0190579 A1 | 7/2009 | Witzel et al. | |
| 2009/0219843 A1* | 9/2009 | Chin et al. | 370/310 |
| 2009/0219924 A1 | 9/2009 | Watanabe et al. | |
| 2009/0227236 A1* | 9/2009 | Sanchez Herrero et al. | 455/414.1 |
| 2010/0124897 A1 | 5/2010 | Edge | |
| 2011/0176680 A1 | 7/2011 | Wu | |
| 2011/0181681 A1 | 7/2011 | Lee | |
| 2013/0039337 A1 | 2/2013 | Hwang et al. | |

FOREIGN PATENT DOCUMENTS

| | | |
|---|---|---|
| CN | 10129289 A | 11/2008 |
| CN | 102138311 A | 7/2011 |
| EP | 1 920 572 A2 | 3/2007 |
| EP | 1 816 877 A1 | 8/2007 |
| EP | 1 965 592 A1 | 9/2008 |
| GB | 2 410 855 A | 8/2005 |
| WO | WO 00/60785 A1 | 10/2000 |
| WO | WO 01/03450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2004/112415 A2 | 12/2004 |
| WO | WO 2006/097837 A1 | 9/2006 |
| WO | WO 2006/105732 A1 | 10/2006 |
| WO | WO 2006/126072 A1 | 11/2006 |
| WO | WO 2007/023358 A2 | 3/2007 |
| WO | WO 2008/021315 A2 | 2/2008 |
| WO | WO 2008/038101 A2 | 4/2008 |

OTHER PUBLICATIONS

Non-Final Official Action for U.S. Appl. No. 11/554,930 (Jul. 7, 2011).
Notice of Allowance and Fee(s) Due for U.S. Appl. No. 11/536,921 (Jun. 30, 2011).
Decision on Petition to Revive for U.S. Appl. No. 11/466,115 (Jun. 28, 2011).
Decision on Petition to Revive for U.S. Appl. No. 11/452,743 (Jun. 22, 2011).
Final Official Action for U.S. Appl. No. 11/440,165 (Jun. 22, 2011).
Notice of Abandonment for U.S. Appl. No. 11/466,115 (May 11, 2011).
Notice of Abandonment for U.S. Appl. No. 11/452,743 (Apr. 27, 2011).
Notice of Panel Decision from Pre-Appeal Brief Review for U.S. Appl. No. 11/554,930 (Apr. 19, 2011).
Chinese Official Action for Chinese patent application No. 200680039435.0 (Mar. 22, 2011).
Final Official Action for U.S. Appl. No. 11/378,776 (Mar. 9, 2011).
Final Official Action for U.S. Appl. No. 11/616,679 (Feb. 25, 2011).
Official Action for U.S. Appl No. 11/440,165 (Feb. 16, 2011).
Official Action for U.S. Appl No. 11/536,921 (Dec. 3, 2010).
Final Official Action for U.S. Appl No. 11/554,930 (Dec. 3, 2010).
Non-Final Official Action for U.S. Appl. No. 11/452,743 (Oct. 13, 2010).
Final Official Action for U.S. Appl. No. 11/466,115 (Oct. 12, 2010).
Official Action for U.S. Appl. No. 11/378,776 (Aug. 18, 2010).
Official Action for U.S. Appl. No. 11/616,679 (Aug. 13, 2010).
Official Action for U.S. Appl. No. 11/440,165 (Aug. 4, 2010).
Official Action for U.S. Appl. No. 11/544,455 (Jul. 19, 2010).
Non-Final Official Action for U.S. Appl. No. 11/554,930 (Apr. 14, 2010).
Final Official Action for U.S. Appl. No. 11/452,743 (Mar. 30, 2010).
Final Official Action for U.S. Appl. No. 11/536,921 (Mar. 4, 2010).
Official Action for U.S. Appl. No. 11/466,115 (Feb. 2, 2010).
Final Official Action for U.S. Appl. No. 11/544,455 (Nov. 27, 2009).
Non-Final Official Action for U.S. Appl. No. 11/452,743 (Oct. 2, 2009).
Final Official Action for U.S. Appl. No. 11/554,930 (Sep. 2, 2009).
Official Action for U.S. Appl. No. 11/536,921 (Jul. 21, 2009).
Official Action for U.S. Appl. No. 11/466,115 (Jun. 23, 2009).
Official Action for U.S. Appl. No. 11/544,455 (Mar. 5, 2009).

(56) References Cited

OTHER PUBLICATIONS

Non-Final Official Action for U.S. Appl. No. 11/554,930 (Feb. 6, 2009).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008). (Part 1 of 2, pp. 1-285).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008). (Part 2 of 2, pp. 286-571).
European Search Report for EP 07024903 (Jul. 23, 2008).
3GPP, "3rd Generation Partnership Project; Technical Specification Group Services and System Aspects; IP Miltimedia Subsystem (IMS) Centralized Services (Release 8)," 3GPP TS 23.892 V8.0.1 (Mar. 2008).
International Search Report for PCT/IB2007/002787 (Mar. 7, 2008).
Notification of Transmittal of the International Search Report and the Written Opinion of the International Searching Authority, or the Declaration for International Application No. PCT/US07/17911 (Feb. 27, 2008).
3GPP, "3rd Generation Partnership Project; Technical Specification Group Services and System Aspects; IP Miltimedia Subsystem (IMS); Stage 2 (Release 8)," 3GPP TS 23.228 V8.1.0 (Jun. 2007).
3GPP, "3rd Generation Partnership Project; Technical Specification Group Core Network and Terminals; Mobile Radio Interface Layer 3 Specification; Core Network Protocols; Stage 3 (Release 7)," 3GPP TS 24.008 V7.8.0 Jun. 2007).
International Search Report for PCT/IB2006/002282 (Feb. 2, 2007).
3GPP SA WG2, "3rd Generation Partnership Project; Technical Specification Group Core Network and Terminals; Voice Call Continuity Between the Circuit-Switched (CS) Domain and the IP Multimedia (IP) Core Network (CN) Subsystem; Stage 3 (Release 7), TS 24.206 V.7.0.0," Technical Specification (TS), Dec. 8, 2006, pp. 1-114, vol. 24.206 No. V7.0.0, 3GPPP Organizational Partners' Publications Offices.
3GPP CT WG1, "3rd Gneration Partnership Project; Technical Specification Group Services and System Aspects; voice Call Continuity (VCC) Between Circuit Switched (CS) and IP Multimedia Subsystem (IMS); Stage 2 (Release 7), TD 23.206 V7.1.0," Technical Specification (TS), Dec. 1, 2006, pp. 1-36, vol. 23.206 No. V7.1.0, 3GPP Organizational Partner's Publications Offices.
International Search Report for PCT/IB2006/001564, Mailed Nov. 14, 2006.
International Search Report for PCT/IB2006/001362 (Oct. 5, 2006).
"3rd Generation Partnership Project; Technical Specification Group Core Network and Terminals; Mobile radio interface Layer 3 specification; Core network protocols; Stage 3 (Release 7)," 3GPP TS 24.008 V7.5.0, pp. 1-538 (Sep. 2006).
"3rd Generation Partnership Project; Technical Specification Group Services and System Aspects; IP Multimedia Subsystem (IMS); Stage 2 (Release 7)," 3GPP TS 23.228 V7.5.0, pp. 1-214 (Sep. 2006).
International Search Report for PCT/IB2006/000607 (Aug. 28, 2006).
Handley et al., "SDP: Session Description Protocol," Network Working Group (Jul. 2006).
3GPP, "3rd Generation Partnership Project; Technical Specification Group Services and System Aspects; Voice Call Continuity Between CS and IMS; Stage 2 (Release 7)," 3GPP TS 23.206 V1.1.0 (Jul. 2006).
Commonly-assigned, co-ending U.S. Appl. No. 11/452,743 for "Selective Call Anchoring in a Multimedia Subsystem," (Unpublished, filed Jun. 14, 2006).
"3rd Generation Partnership Project; Technical Specification Group Core Network and Terminals; Mobile radio interface Layer 3 specification; Core network protocols; Stage 3 (Release 7)," 3GPP TS 24.008, V7.4.0, pp. 1-534 (Jun. 2006).
3GPP, "3rd Generation Partnership, Project; Technical Specification Group Services and System Aspects; Multimedia Broadcast/Multicast Service (MBMS); Architecture and Functional Description (Release 6)," 3GPP TS 23.246 V6.10.0 (Jun. 2006).
3GPP TSG-SA WG2 Meeting #46, Technical Document: Tdoc S2-050995, Service Continuity—Network Domain Selection (May 13, 2006).
3GPP SA WG2, "Voice Call Continuity Between CS and IMS Study (3GPP TR 23.806 version 7.00.0 Release 7)," Technical Specification (TS), Dec. 1, 2005, pp. 1-153, vol. 23.806 No. V7.0.0, 3GPP Organizational Partners' Publications Offices.
3GPP, "3rd Generation Partnership Project; Technical Specification Group Services and System Aspects; Voice Call Continuity Between CS and IMS Study (Release 7)," 3GPP TR 23.806 V1.4.0 (Aug. 2005). (Part 1 of 2, pp. 1-90).
3GPP, "3rd Generation Partnership Project; Technical Specification Group Services and System Aspects; Voice Call Continuity Between CS and IMS Study (Release 7)," 3GPP TR 23.806 V1.4.0 (Aug. 2005). (Part 2 of 2, pp. 91-180).
U.S. Appl. No. 60/690,843 (Jun. 15, 2005).
"Session Initiation Procotol (SIP Tutorial: SIP to ISDN Q.931 Call Flow (Brief))," EventHelix, http://www.EventHelix.com/EventStudio (Downloaded from the Internet on Jun. 10, 2005).
"Session Initiation Protocol (SIP Tutorial: SIP to PSTN Call Flow)," EventHelix, http://www.EventHelix.com/EventStudio (Downloaded from the Internet on Jun. 10, 2005).
Strater et al., "Seamless Mobility Between Home Networks and Cable Service," Motorola White Paper (May 27, 2005).
Groves et al., "Gateway Control Protocol Version 1," Network Working Group (Jun. 2003).
Roach, "Session Initiation Protocol (SIP)—Specific Event Notification," Network Working Group, RFC 3265 (Jun. 2002).
Rosenberg et al., "SIP: Session Initiation Protocol," Network Working Group, RFC 3261 (Jun. 2002).
Hanmer, "Call Processing," Lucent Technologies, pp. 1-11 (Jun. 28, 2001).
3GPP, "3rd Generation Partnership Project; Universal Mobile Telecommunications System; Mobile Radio Interface Layer 3 Specification, Core Network Protocols—Stage 3," TS 24.008 V3.0.0 (Jul. 1999).
Office Action for Japanese Patent Application No. 2009-529788 (Jun. 5, 2012).
Second Office Action for Chinese Patent Application No. 200680039435.0 (Mar. 27, 2012).
Applicant-Initiated Interview Summary for U.S. Appl. No. 11/554,930 (Mar. 21, 2012).
Notice of Allowance and Fee(s) Due for U.S. Appl. No. 11/466,115 (Feb. 21, 2012).
Non-Final Official Action for U.S. Appl. No. 11/378,776 (Jan. 20, 2012).
Non-Final Official Action for U.S. Appl. No. 11/440,165 (Jan. 19, 2012).
Final Official Action for U.S. Appl. No. 11/554,930 (Dec. 2, 2011).
Notice of Allowance and Fee(s) Due for U.S. Appl. No. 11/452,743 (Nov. 7, 2011).
Notice of Panel Decision from Pre-Appeal Brief Review for U.S. Appl. No. 11/440,165 (Nov. 3, 2011).
Interview Summary for U.S. Appl. No. 11/466,115 (Oct. 18, 2011).
First Office Action for Chinese Patent Application No. 200780038011.7 (Sep. 16, 2011).
Official Action for U.S. Appl. No. 11/466,115 (Jul. 12, 2011).
Communication pursuant to Article 94(3) EPC for European Application No. 07024903.2 (Apr. 2, 2009).
"3rd Generation Partnership Project; Technical Specification Group Services and System Aspects; Voice Call Continuity between CS and IMS Study (Release 7)," 3GPP TR 23.806, V1.5.0, pp. 1-148 (Aug. 2005).
Extended European Search Report for Eurupean Application No. 06795307.5 (Jan. 18, 2013).
Notice of Grant for Chinese Patent Application No. 200680039435.0 (Nov. 26, 2012).
Advisory Action for U.S. Appl. No. 11/378,776 (Nov. 5, 2012).
Extended European Search Report for European Application No. 06727330.0 (Jun. 27, 2012).
Final Office Action for U.S. Appl. No. 11/378,776 (May 24, 2012).

(56) References Cited

OTHER PUBLICATIONS

"3rd Generation Partnership Project; Technical Specification Group Services and System Aspects; Voice Call Continuity between CS and IMS; Stage 2 (Release 7);" 3GPP TS 23.206 V0.3.0, pp. 1-22 (Feb. 2006).

"Architectural Alternative for CS-IMS Voice Call Continuity Based on IMS Control," Nortel, 3GPP TSG SA WG2 Architecture—S2#45, pp. 1-9 (Apr. 4-8, 2005).

"WID for Voice Call Continuity Between CS and IMS (incl. I-WLAN)," TSG SA WG2, Technical Specification Group Services and System Aspects, pp. 1-5 (Mar. 14-17, 2005).

Notice of Allowance and Fee(s) Due for U.S. Appl. No. 11/616,679 (Aug. 2, 2013).

Applicant-Initiated Interview Summary for U.S. Appl. No. 11/616,679 (Aug. 1, 2013).

First Office Action for Chinese Patent Application No. 200780043894.0 (May 31, 2013).

Non-Final Office Action for U.S. Appl. No. 11/554,930 (Mar. 18, 2013).

Notice of Abandonment for U.S. Appl. No. 11/440,165 (Feb. 5, 2013).

Interview Summary for U.S. Appl. No. 11/378,776 (Nov. 30, 2012).

\* cited by examiner

ADDING A SERVICE CONTROL CHANNEL AFTER SESSION ESTABLISHMENT

This application claim the benefit of U.S. provisional patent application Ser. No. 60/971,621 filed Sep. 12, 2007, the disclosure of which is incorporated herein by reference in its entirety.

FIELD OF THE INVENTION

The present invention relates to telecommunications, and in particular to adding a service control channel after establishment of a session.

BACKGROUND OF THE INVENTION

The Third Generation Partnership Project (3GPP) and Third Generation Partnership Project 2 (3GPP2) have developed sets of specifications that describe a flexible Next Generation Networking (NGN) architecture for implementing Internet Protocol (IP) based telephony and rich multimedia services over next generation packet-based networks as well as traditional circuit-switched networks. The architecture is referred to as an IP Multimedia Subsystem (IMS) and effectively provides centralized control of IP based telephony and multimedia services to users that are supported by different packet-switched (PS) and circuit-switched (CS) access networks. The access networks may be wired or wireless and may include local area networks, cellular networks, wireless local area networks, cable networks, public switched telephone networks, and the like. As such, service providers are able to provide and control services from a common platform independent of the type of access network that is serving the users.

The services provided by IMS are generally referred to as IMS Centralized Services (ICS) and some are set forth in the 3GPP TS 23.292 V8.0.0 technical specification, which is incorporated herein by reference in its entirety. This technical specification specifies the architectural requirements for delivery of consistent IMS services to a user regardless of the type of access network. When using a PS access network that is capable of supporting full-duplex voice communications, the PS access network is used to establish a packet-switched bearer path to carry media for IMS sessions, as set forth in the 3GPP TS 23.228 technical specification, which is also incorporated herein by reference. When using a CS access network or a PS access network that does not support full-duplex voice communications, the CS access network and associated CS core network are used to establish a circuit-switched bearer path to carry media for IMS sessions. ICS provides mechanisms to use the circuit-switched bearer paths in the CS access networks for IMS sessions as well as provide service control and continuity when using these circuit-switched bearer paths for IMS sessions.

While establishing and controlling IMS sessions supported by PS access networks that support voice communications are relatively straightforward, significant complexities arise when establishing and controlling IMS sessions via CS access networks. When the bearer path for an IMS session is provided by a CS access network, a transparent control channel is established between the ICS capable user terminal and the IMS. If the user terminal is not ICS capable, the control channel will extend between the IMS and a service node, such as an ICS enhanced mobile switching center (MSC) that operates as an ICS client on behalf of the user terminal. The control channel is generally referred to as a service control channel, and is used by the IMS to provide IMS services and control IMS sessions when those IMS sessions have a bearer path provided in the CS access network.

Although the bearer path for an IMS session may be supported by a CS access network, the service control channel may be provided via the CS access network or, if available, a PS access network. When the service control channel is provided by the PS access network in these instances, it is generally assumed that the PS access network will not support voice communications, but is capable of supporting the exchange of information between the user terminal, or an agent thereof, and the IMS. In either case, the service control channel is separate from a CS bearer control signaling channel that is used to establish and control the portion of the bearer path that extends through the CS access network. Currently, the service control channel must be established and associated with the CS bearer signaling channel when IMS sessions are established, even if the IMS sessions do not initially invoke IMS services. Establishment, and in particular, the association of the service control channel and the CS bearer control signaling channel is time consuming and often unnecessary for basic voice calls. The time associated with establishing and associating these channels delays call setup, and when IMS services are not invoked during the session, wastes resources.

Accordingly, there is a need for a mechanism to add an associated service control channel for an IMS session when an IMS service is required. There is a further need to allow initiation of an IMS session that employs a CS bearer path without associating a service control channel with the IMS session, and subsequently adding a service control channel for the IMS session when IMS services are needed.

SUMMARY OF THE INVENTION

For an IMS session that employs a CS bearer path for at least a portion of the overall bearer path that supports a local user element, the present invention provides for establishing and using the IMS session without associating a service control signaling channel with the IMS session when the IMS session is initially established. Accordingly, the IMS session is established with a local user element via a CS access network, wherein the CS bearer control signaling path and CS bearer path are supported by the CS access network. The CS bearer control signaling path extends into the IMS to an IMS continuity control function (ICCF) and is interworked with a remote leg that provides a signaling path for session signaling with a remote user element. A bearer path, including the CS bearer path, supports the flow of session traffic between a local user element being served by the CS access network and the remote user element.

After the IMS session is established and operable to support communications between the local and remote user elements, a service control signaling channel for the local user element may be established and associated with the IMS session to facilitate IMS services that require the use of service control signaling. Before or when a service is invoked, the local user element, the network, or an agent thereof may establish the service control signaling channel wherein the IMS will associate the service control signaling channel with the current IMS session and employ service control signaling over the service control signaling channel to facilitate IMS services.

The service control signaling channel may be established by routing a service control signaling message into the ICCF, which will associate the service control signaling channel with the previously established IMS session. Once associated, the service control signaling channel can be used to provide the necessary service control signaling to the local user element or an agent thereof to facilitate various IMS services. Although the CS bearer path and the associated CS bearer control signaling path are supported by the CS access network, the service control signaling channel may be provided via the CS access network or an available PS access network.

In one embodiment, different public service identities (PSIs) are used to set up the IMS session and add the service control signaling channel. A setup PSI aids in routing the CS bearer control signaling to the ICCF through the CS access network to initiate the IMS session and effectively establish the CS bearer control signaling path. The setup PSI may include or be associated with indicium that instructs the ICCF to proceed with session initiation and establishment without the benefit of service control signaling or establishment of a service control signaling channel. The setup PSI may be separate or embedded in an IMS multimedia routing number (IMRN) or the like, which is used by entities in the CS access network and IMS to route the CS bearer control signaling through the CS access network and to the ICCF in the IMS.

To add the service control signaling channel to the IMS session, a message including an augmentation PSI is delivered to the ICCF. The augmentation PSI notifies the ICCF that the incoming message is intended to augment, or modify, the IMS session and is not intended to initiate a new IMS session. The ICCF will interwork the service control signaling channel and the CS bearer control signaling with the remote leg to effectively add the service control signaling channel to the IMS session. Establishment of the service control signaling channel may coincide with a request to invoke an IMS service, and as such, the message or messages used to establish the service control signaling channel may identify an IMS service to apply to the IMS session. Once the service control signaling channel is established, appropriate IMS services may be provided.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3A:
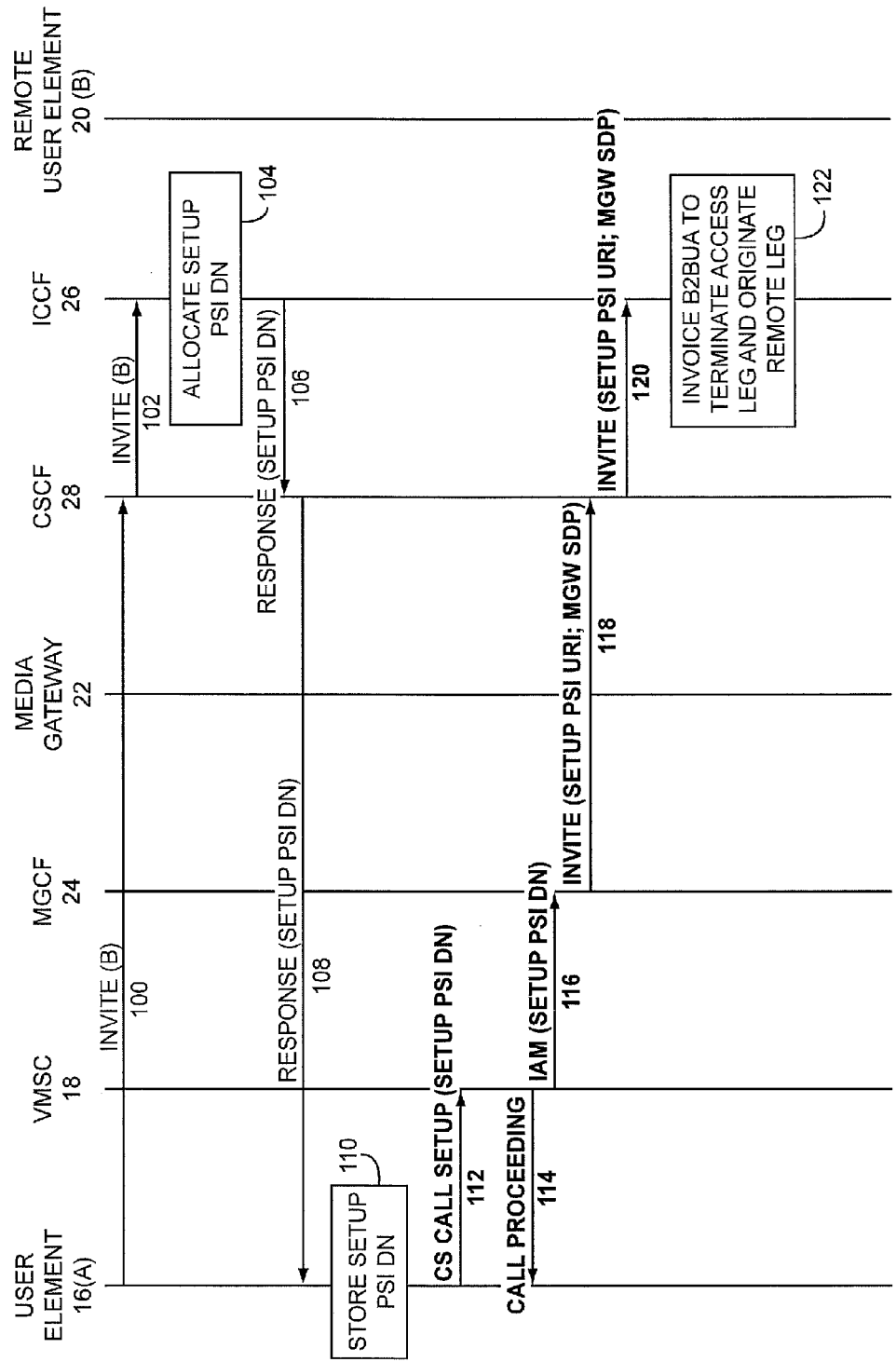
Figure 3B:
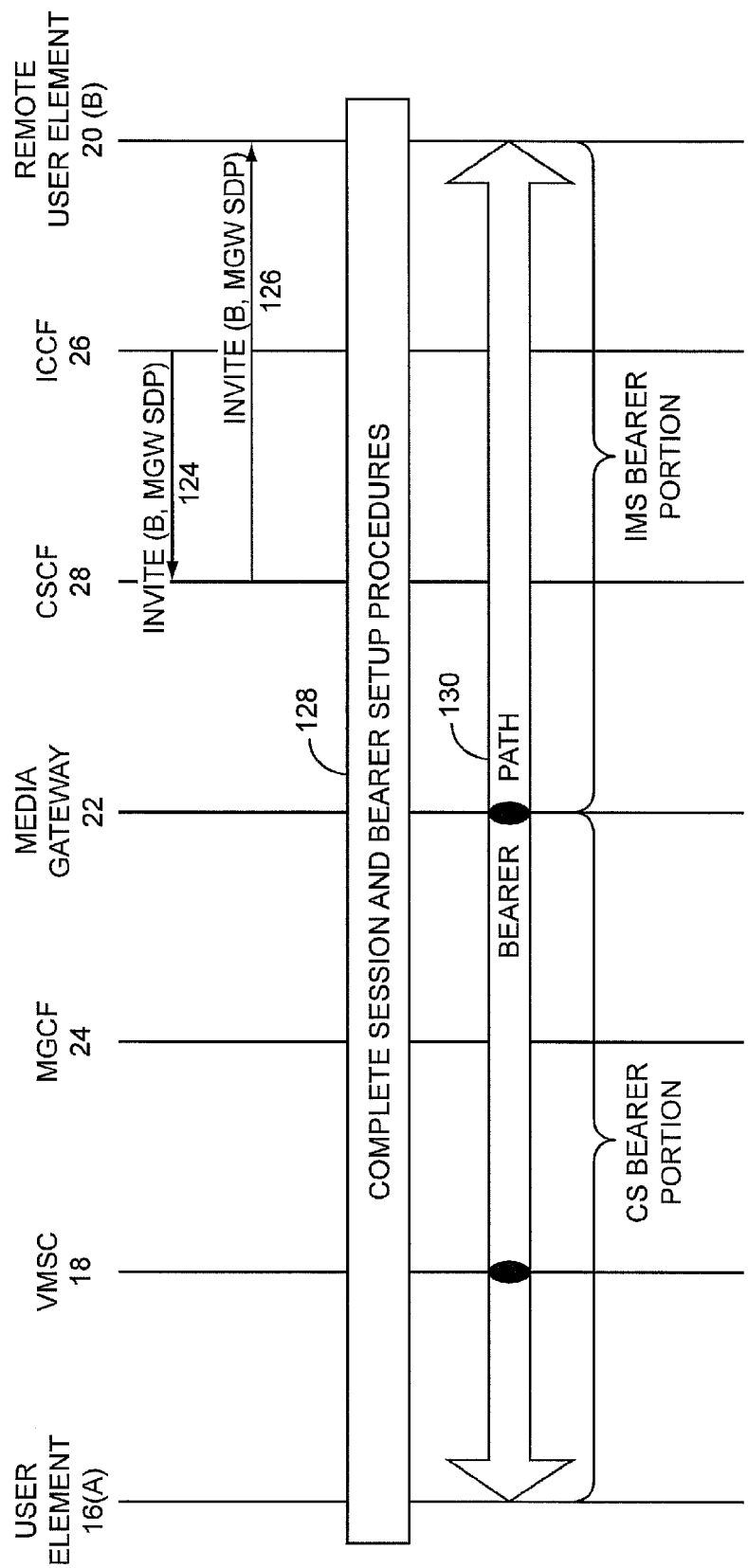

FIGS. 3A and 3B provide a communication flow diagram illustrating initiation of an IMS session using a setup PSI obtained via a PS access network from an IMS.

Figure 4A:
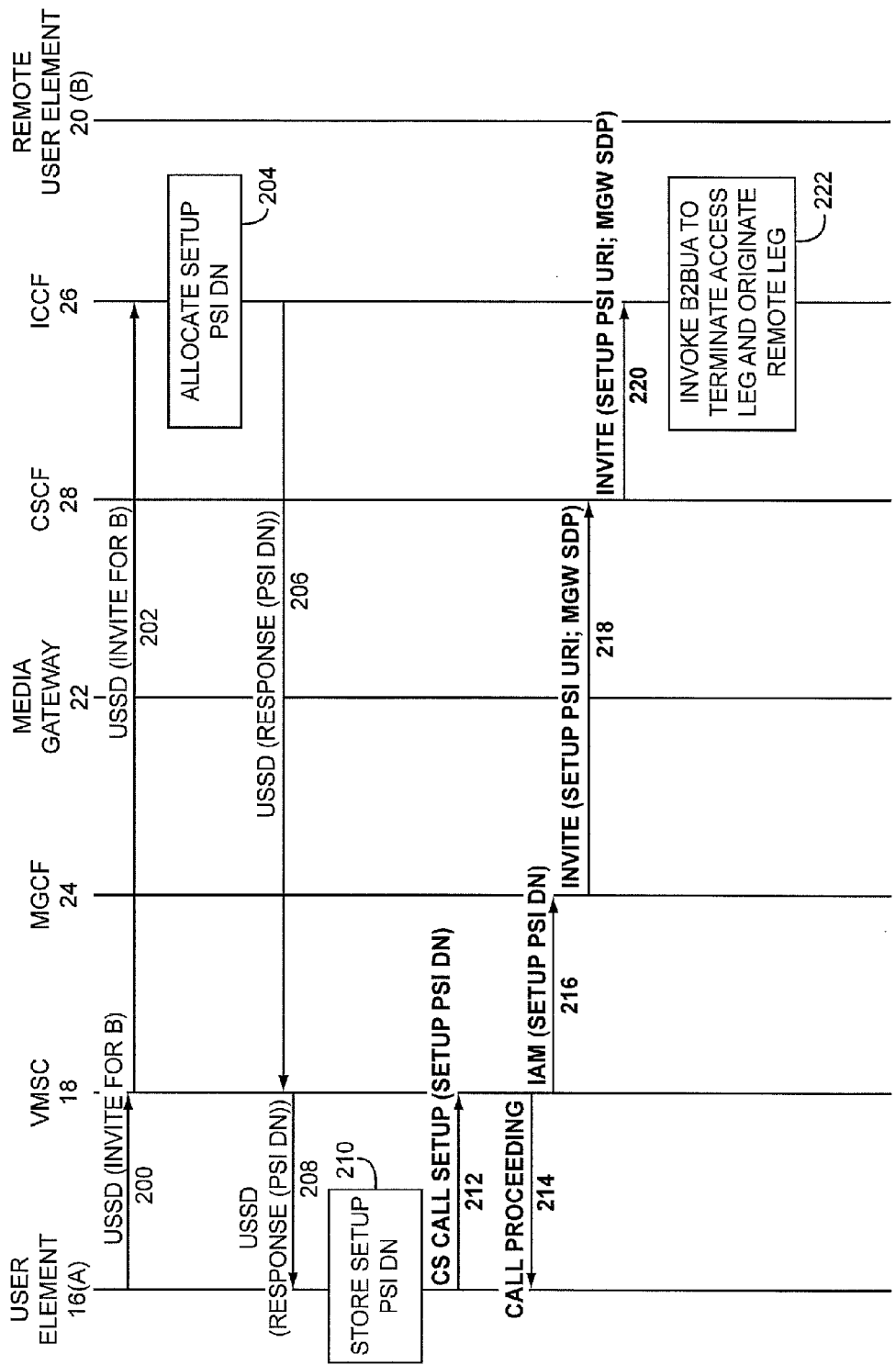
Figure 4B:
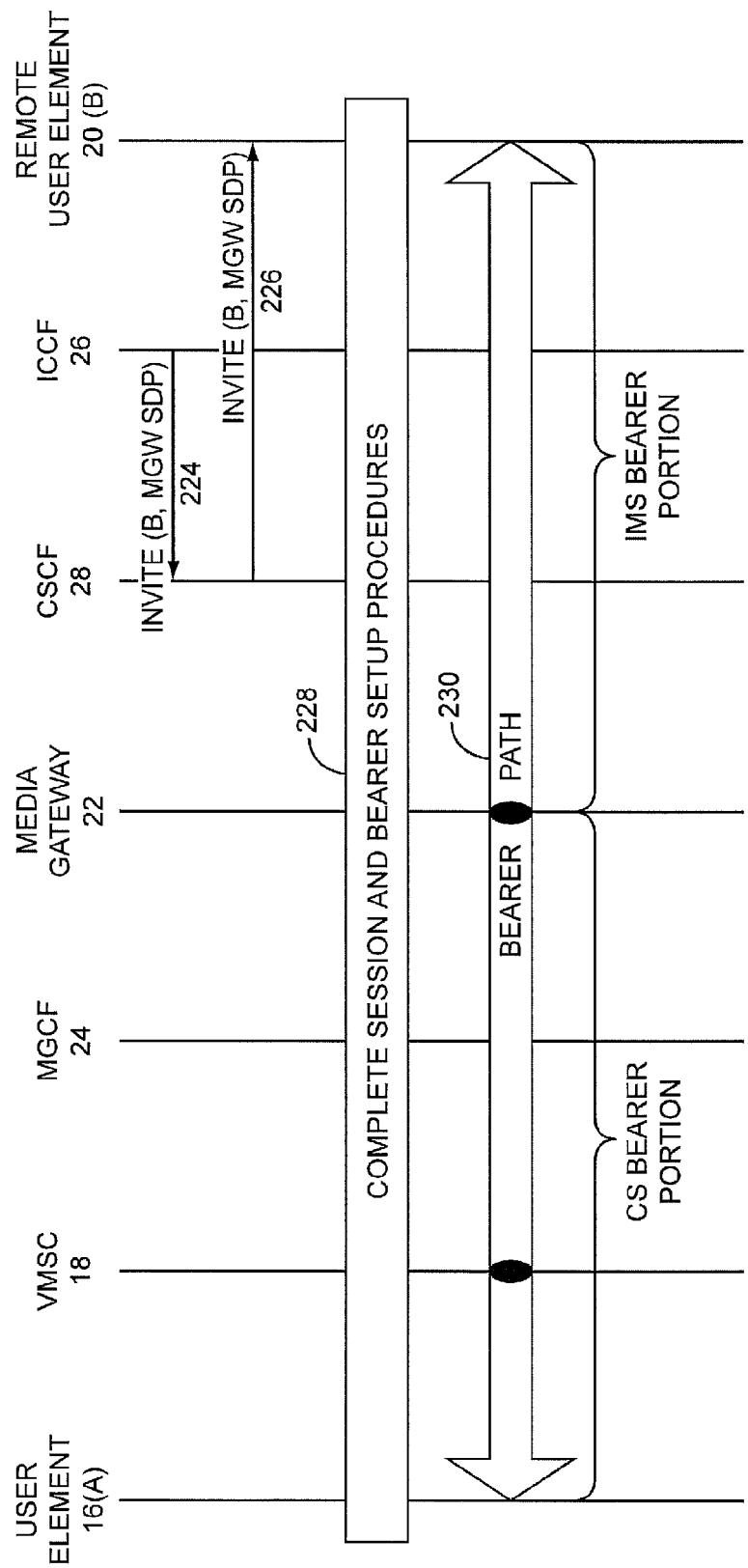

FIGS. 4A and 4B provide a communication flow diagram illustrating initiation of an IMS session using a setup PSI obtained via a CS access network from an IMS.

Figure 5A:
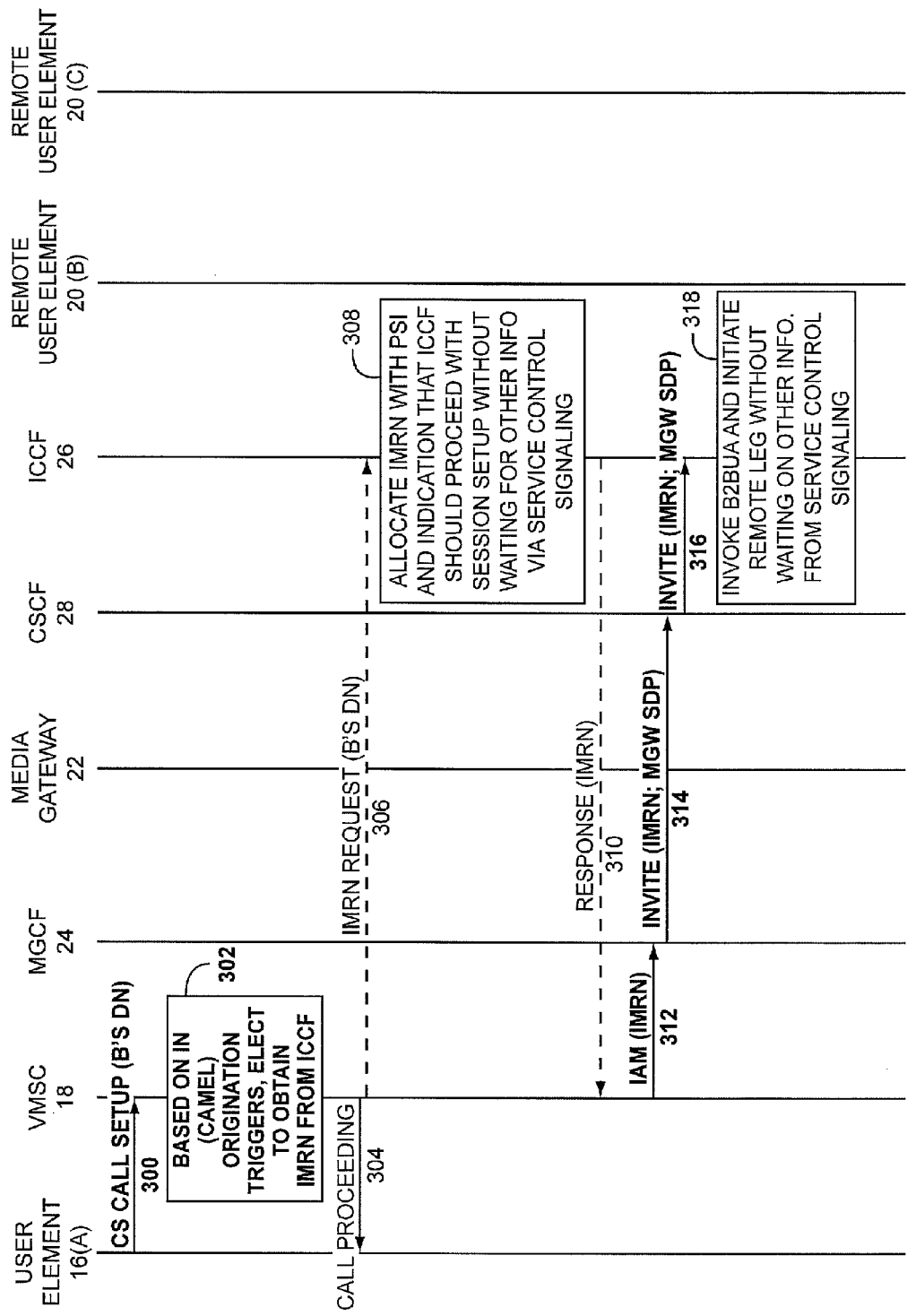
Figure 5B:
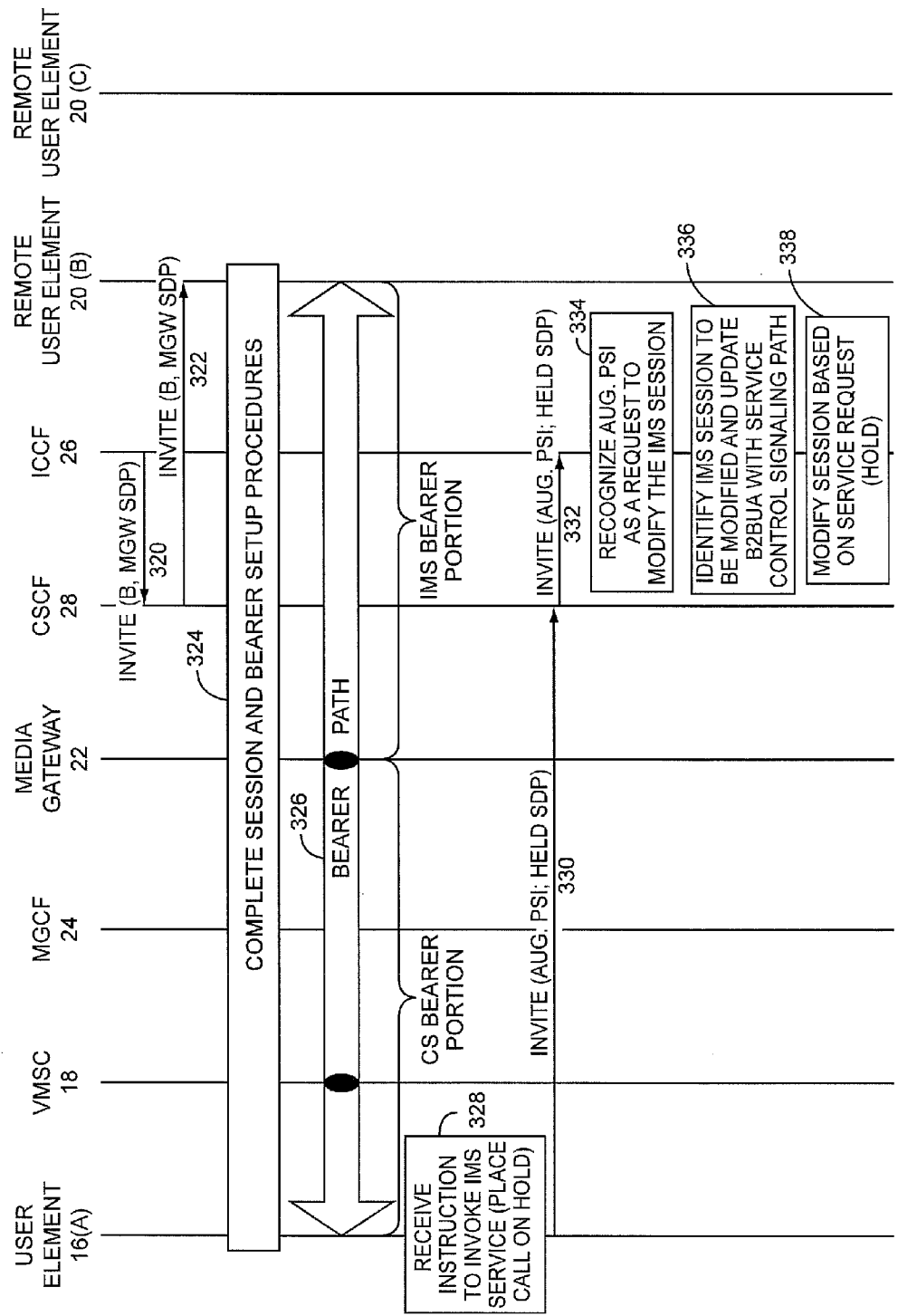
Figure 5C:
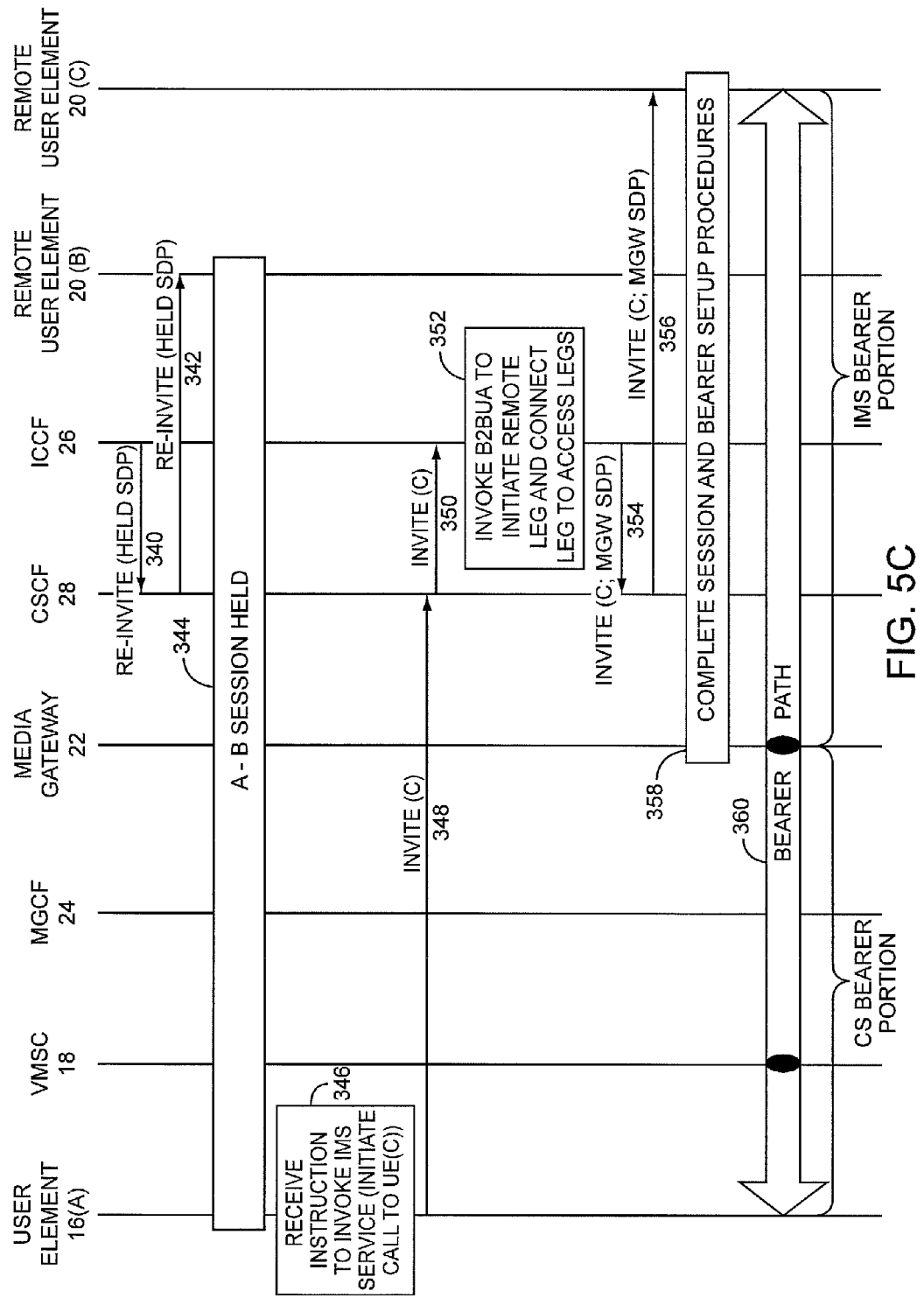

FIGS. 5A-5C provide a communication flow diagram illustrating initiation of an IMS session and subsequent addition of a service control channel via a PS access network.

Figure 6A:
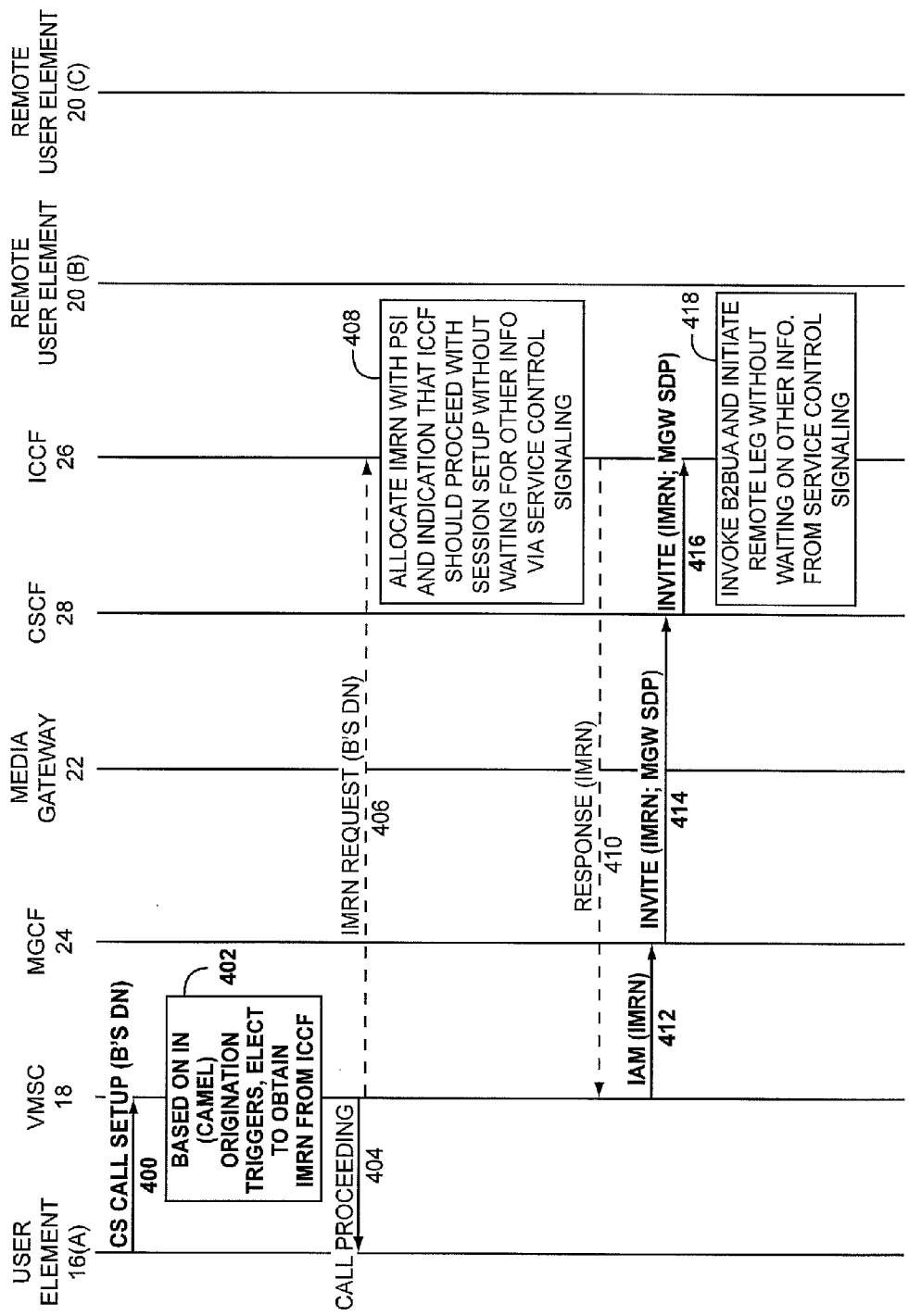
Figure 6B:
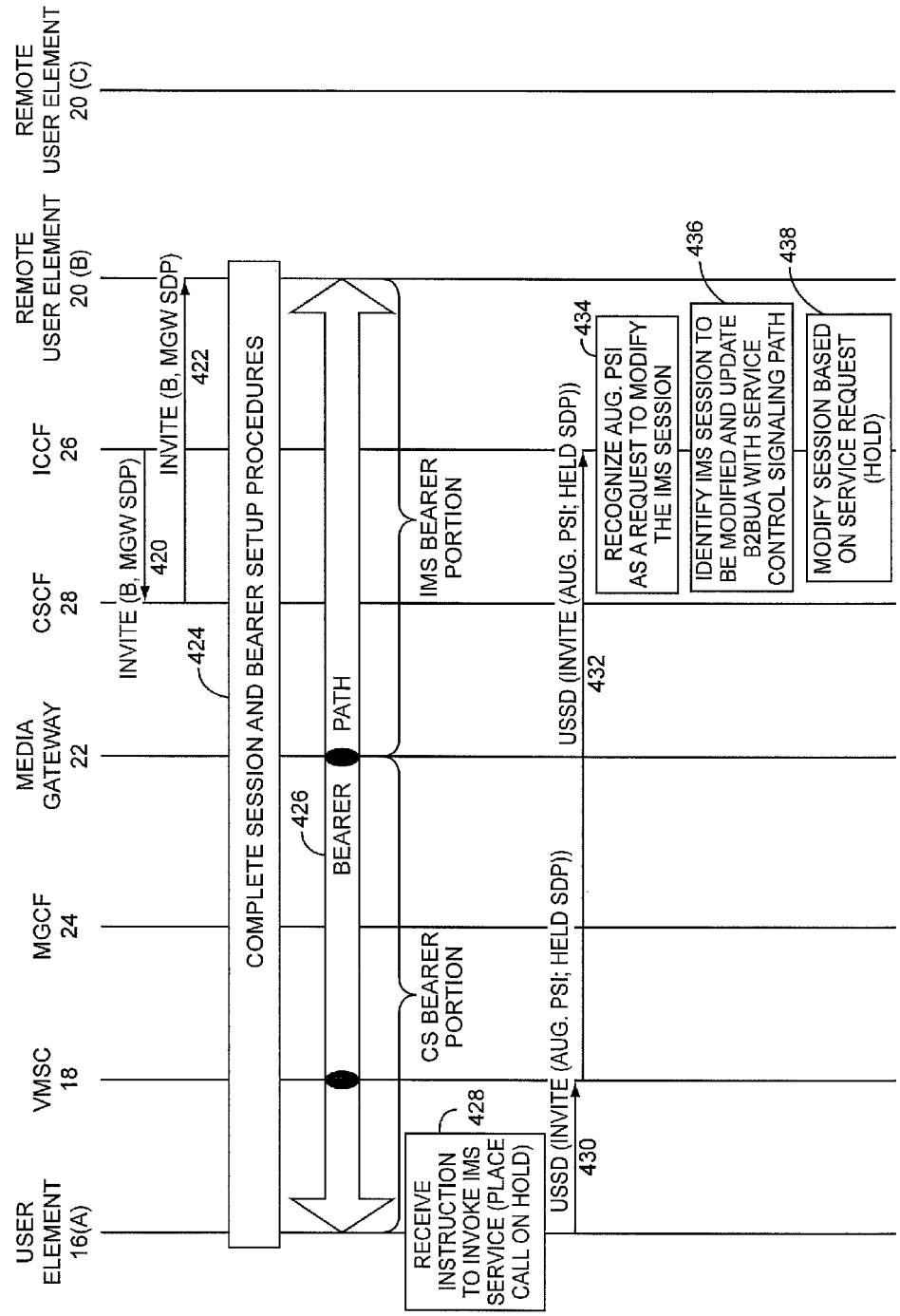
Figure 6C:
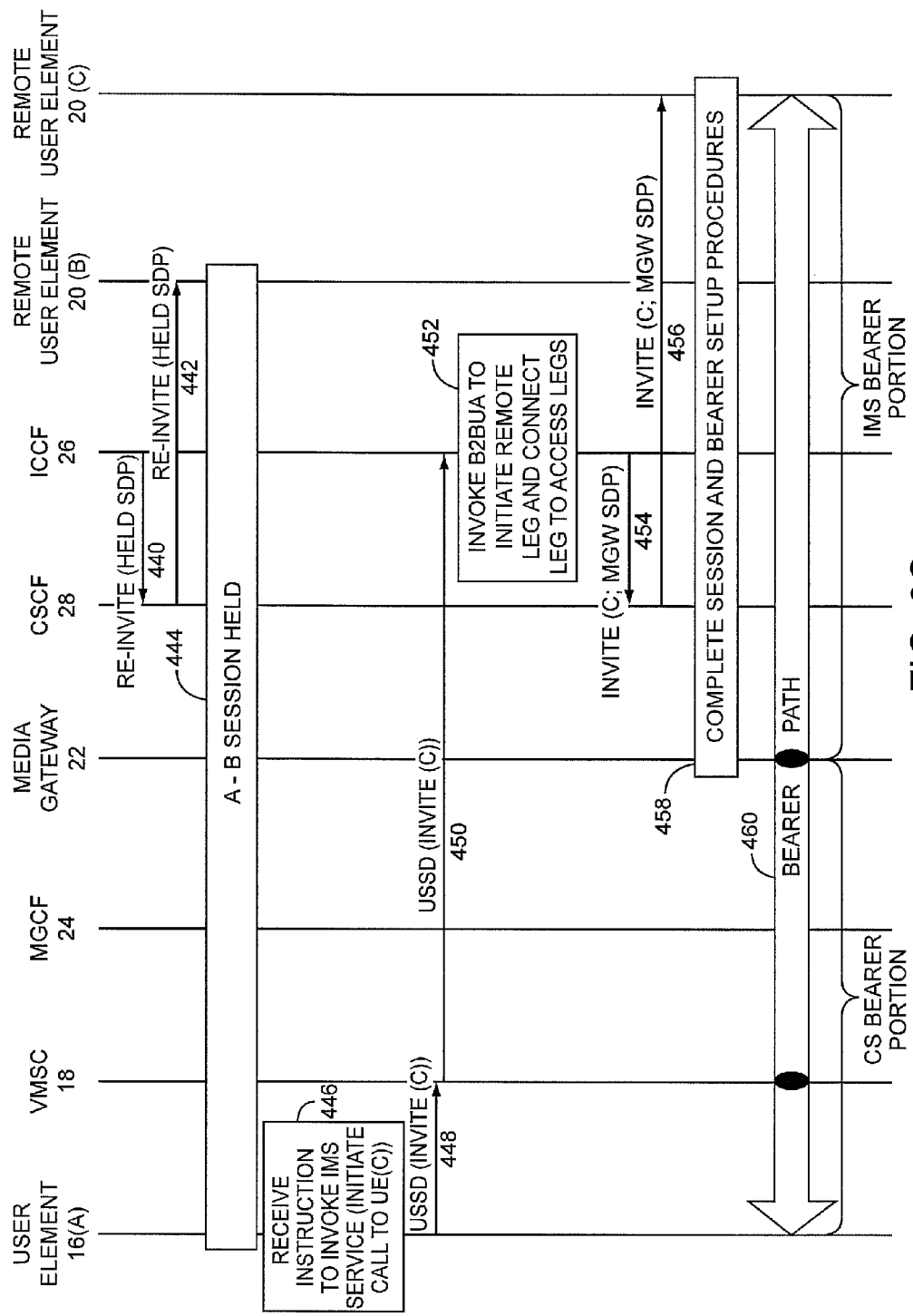

FIGS. 6A-6C provide a communication flow diagram illustrating initiation of an IMS session and subsequent addition of a service control channel via a CS access network.

Figure 7:
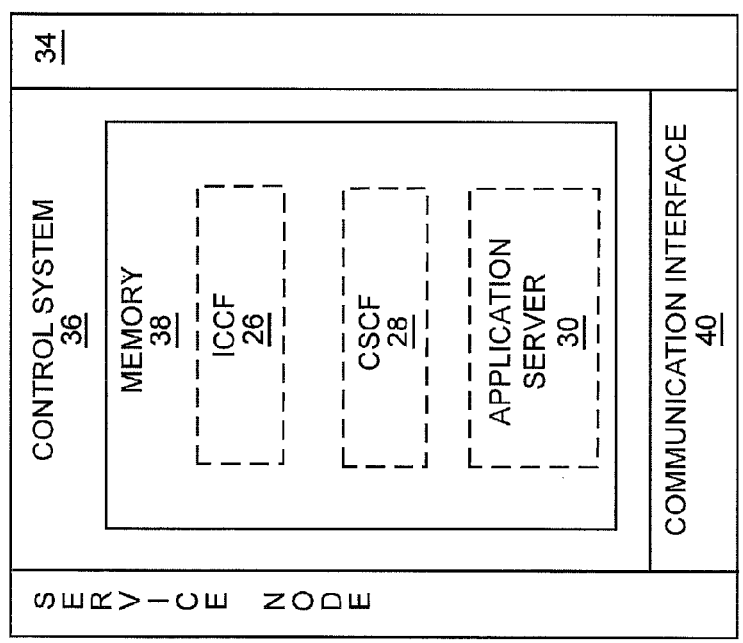

FIG. 7 is block representation of a service node according to one embodiment of the present invention.

Figure 8:
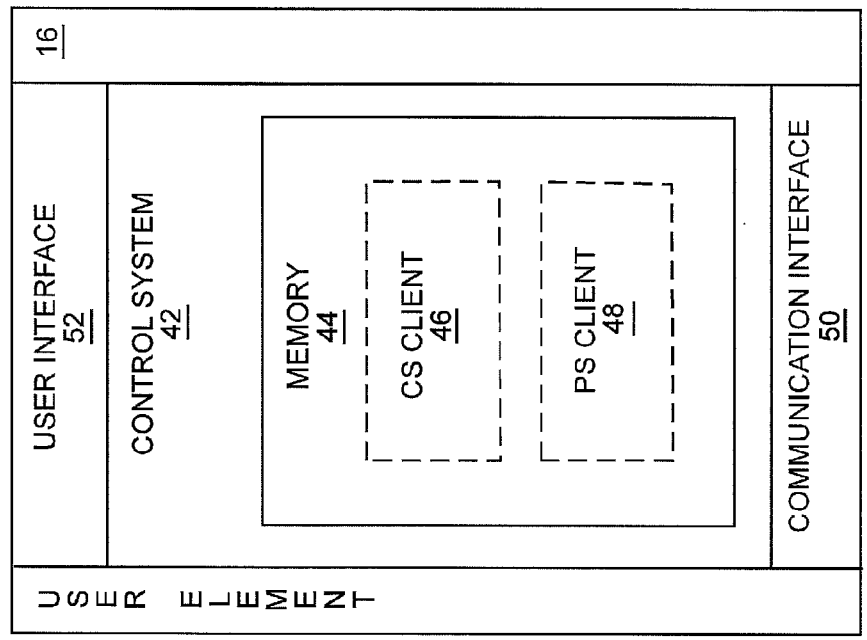

FIG. 8 is block representation of a user element according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In the following description, the term IMS refers to a centralized packet-based multimedia subsystem that is based on the Internet Protocol (IP) and is capable of providing IP based telephony and rich multimedia services over next generation packet-based networks that employ packet-switched (PS) access networks as well as traditional circuit-switched networks that employ circuit-switched (CS) access networks. Within an IMS, the present invention relates to the use of service control channels for IMS sessions that employ a CS bearer path, and in particular to being able to add a service control channel for such IMS sessions after the IMS sessions have been established. Upon establishing a service control channel, centralized services that are controlled by the IMS may be invoked by a party to the IMS session. In the illustrated embodiments, the services provided by IMS are generally referred to as IMS Centralized Services (ICS) as set forth in the 3GPP TS 23.292 V8.0.0 and earlier technical specifications, which are incorporated herein by reference in their entireties.

Figure 1:
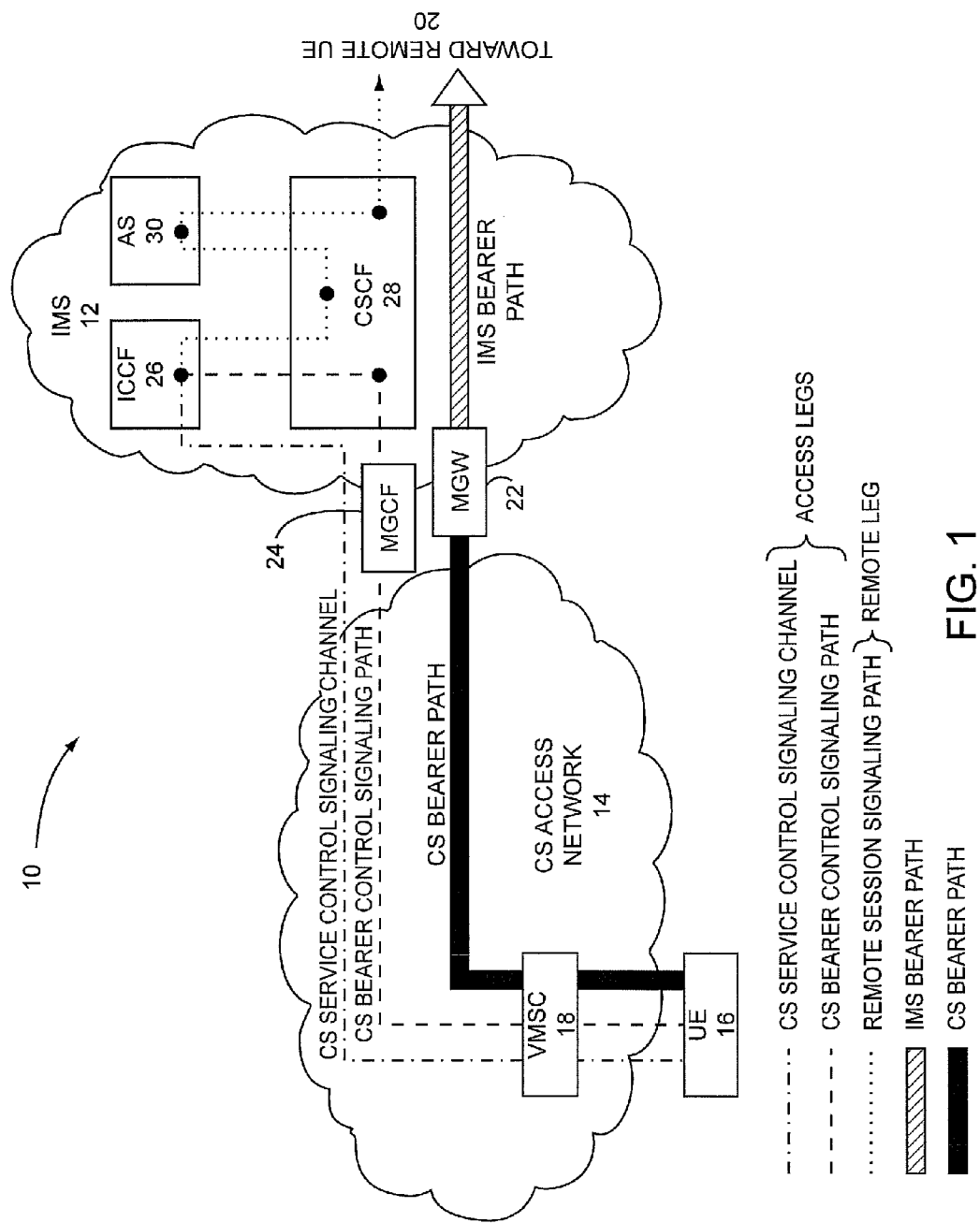
FIG. 1 illustrates an IMS communication environment having a CS service control channel provided via a CS access network.
Figure 2:
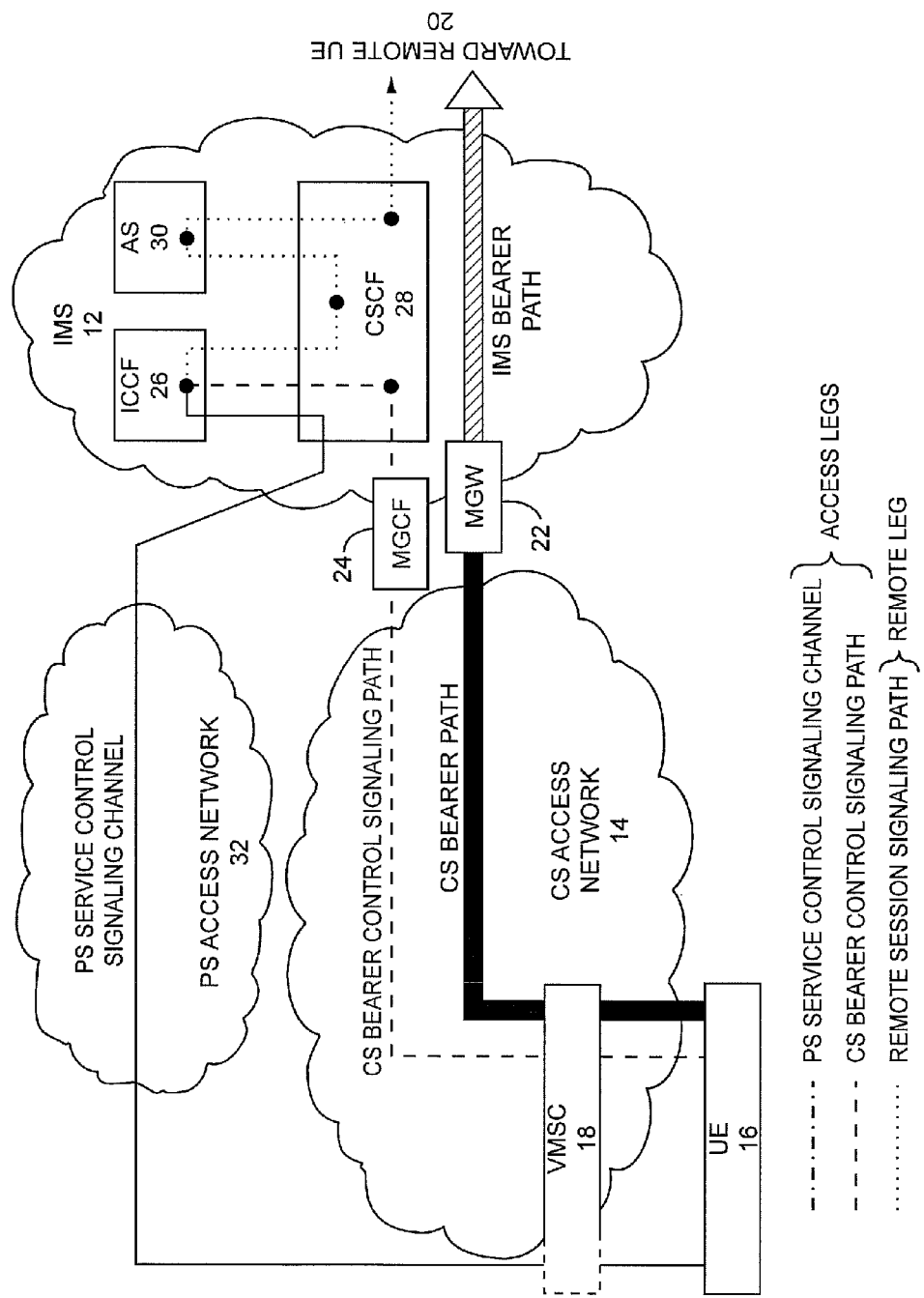
FIG. 2 illustrates an IMS communication environment having a PS service control channel provided via a CS access network.

Prior to delving into the details of the present invention, an overview is provided of two different IMS environments in which concepts of the present invention may be employed. The first environment is illustrated in FIG. 1 and illustrates the use of a CS service control channel that is established via a CS access network, while the second environment is illustrated in FIG. 2 and illustrates the use of a PS service control channel that is established via a PS access network. With particular reference to FIG. 1, a communication environment 10 is illustrated as having an IMS 12 and a CS access network 14, which are directly or indirectly coupled to one another. The CS access network 14 may represent any type of wired or wireless access network, but for the purposes of description is assumed to be a Global System for Mobile Communications (GSM) access network. As such, the CS access network 14 is capable of facilitating wireless communications with a user element (UE) 16 via a visited mobile switching center (VMSC) 18 and a cellular network of base stations, which are not illustrated for clarity.

An IMS session is established between the user element 16 and a remote user element 20. As illustrated, the overall bearer path for the IMS session has a portion supported in the CS access network 14 along a CS bearer path and a portion supported in the IMS 12 along an IMS bearer path. The CS bearer path and the IMS bearer path are interworked by a media gateway (MGW) 22, which operates under the control of a media gateway control function (MGCF) 24. Circuit-switched traffic originating from the user element 16 and intended for the remote user element 20 is converted to packet traffic and packet traffic, and vice versa, by the media gateway 22. As such, a circuit-switched connection is established between the media gateway 22 and the user element 16 via the VMSC 18 and any other necessary network elements along the CS bearer path. A packet session is established between the media gateway and the remote user element 20 along the IMS bearer path, assuming the remote user element 20 is capable of supporting a packet session. Otherwise, an IMS bearer path is connected to another media gateway that is serving the remote user element 20 via a remote CS access network, which is not illustrated.

Session signaling is required to establish and control an IMS session. When a CS bearer path is used to provide part of the overall bearer path for an IMS session, there are generally three types of signaling: CS bearer control signaling, CS service control signaling, and remote session signaling. The CS bearer control signaling, CS service control signaling, and remote session signaling are anchored in the IMS 12 at an IMS continuity control function (ICCF) 26. The ICCF 26 is a home network-based application server in the IMS 12 providing the functionality to enable IMS centralized services, and is specifically configured to interwork and provide continuity among the signaling for the IMS session, as will be described below in further detail.

In general, the CS bearer control signaling is used to set up, release, and otherwise control the CS bearer path that extends between the user element 16 and the media gateway 22. The CS service control signaling is associated with the CS portion of the IMS session and is used to control the IMS session via the CS access network to provide IMS services. The remote session signaling is associated with the portion of the IMS session that extends from the IMS 12 toward the remote user element 20 and is used to control the remote end of the IMS session to provide IMS services.

A CS bearer control signaling path for the CS bearer control signaling extends between the user element 16 or VMSC 18 and ICCF 26 through the MGCF 24 and at least one call/session control function (CSCF) 28, which is described below in further detail. Through the CS bearer control signaling path, the user element 16, VMSC 18, MGCF 24 and the ICCF 26 may communicate with each other to establish, release, and otherwise control the CS bearer path. However, once the CS bearer path for an IMS session is established, a control mechanism in addition to the CS bearer control signaling is required for most IMS services. In the embodiment illustrated in FIG. 1, the additional control mechanism is the CS service control signaling that is provided over a CS service control signaling channel, which is separate from the CS bearer control signaling path. In this embodiment, the CS service control signaling channel extends through the CS access network 14 and directly into the ICCF 26 of the IMS 12 without being routed through the CSCF 28. In a GSM environment, the CS service control signaling may be provided via Unstructured Supplementary Service Data (USSD) messaging wherein the USSD signaling path may pass through a home location resource (HLR) or home subscriber system (HSS) that is associated with the subscriber.

In general, signaling for an IMS session is routed through the CSCF 28, which performs signaling operations for call or session control. To provide IMS services of an IMS application, the CSCF 28 will invoke the application server (AS) 30 that provides the IMS services and loop the IMS signaling through the application server 30. The application server 30 will provide the corresponding IMS services by manipulating the IMS signaling and returning the IMS signaling to the CSCF 28 for further routing. The IMS signaling may be passed through any number of application servers 30 to invoke different IMS services. As those skilled in the art will appreciate, the CSCF 28 may represent one or more Proxy CSCFs (P-CSCF), Serving CSCFs (S-CSCF), or Interrogating CSCF (I-CSCF), as set forth by the 3GPP.

The ICCF 26 is generally a form of IMS service that is provided by an application server 30 and functions to anchor the CS bearer control signaling path, the CS service control signaling channel, and the remote session signaling path, which extends through the IMS 12 toward the remote user element 20. In particular, the ICCF 26 provides a remote user agent that acts on behalf of the user element 16. The remote user agent represents the user element 16 as an IMS entity to the remote user element 20. Currently, IMS architectures employ the Session Initiation Protocol (SIP) as the primary communication protocol. In a SIP environment, the remote user agent is a SIP user agent that represents the user element 16, and as such, the remote user element 20 effectively interacts with the SIP user agent.

In providing the remote user agent for the user element 16, the ICCF 26 may effectively combine the CS service control signaling and the CS bearer control signaling of the user element 16 and present standard IMS session signaling toward the remote user element 20 via the remote session signaling path. The ICCF 26 may receive IMS session signaling from the remote user element 20 (or user agent thereof) and provide appropriate CS service control signaling and CS beater control signaling through the CS access network 14. Accordingly, the CS service control signaling channel and the CS bearer control signaling path represent the access legs, while the remote signaling path represents a remote leg for IMS signaling. This functionality is generally referred to as a back-to-back user agent (B2BUA).

The ICCF 26 or other service node may also provide a CS access adaptation function (CAAF) when the service control signaling channel is a CS service control signaling channel provided via the CS access network 14. Because the CS service signaling is generally not compatible with the SIP or like signaling used in the IMS 12, the CAAF may need to interwork the CS service control signaling with the signaling provided in the IMS 12. For example, the CAAF may provide interworking between USSD messages used in the CS access network 14 and the SIP messages in the IMS 12. Generally, the CAAF is not required when PS service control signaling is provided via the PS access network 32, as illustrated in FIG. 2.

The first embodiment employed the use of a CS service control channel for controlling IMS services in the CS access network. A second embodiment as illustrated in FIG. 2 employs the use of a PS service control channel that is established via a PS access network 32 instead of the CS service control channel provided in the CS access network 14. The PS access network 32 may be supported by a separate access network, such as a wireless local area network, or in association with the CS access network 14, such as a GSM cellular network that provides circuit-switched voice along with packet service that is insufficient to support full-duplex voice communications.

In addition to the PS access network 32, the communication environment 10 is illustrated as having the IMS 12 and the CS access network 14, as described above. Again, the CS access network 14 may represent any type of wired or wireless access network, but for the purposes of description is assumed to be a GSM access network. As such, the CS access network 14 is capable of facilitating wireless communications with the user element 16 via the VMSC 18 and associated base stations.

As illustrated, an IMS session is established between the user element 16 and a remote user element 20. As illustrated, the overall bearer path for the IMS session has a portion supported in the CS access network 14 along a CS bearer path and a portion supported in the IMS 12 along an IMS bearer path. The CS bearer path and the IMS bearer path are interworked by the media gateway 22, which operates under the control of the media gateway control function 24. Circuit-switched traffic originating from the user element 16 and intended for the remote user element 20 is converted to packet traffic, and vice versa, by the media gateway 22.

In this embodiment, when a CS bearer path is used to provide part of the overall bearer path for an IMS session, there are also three types of signaling: CS bearer control signaling, PS service control signaling instead of CS service control signaling, and remote session signaling. The primary difference between this embodiment and the earlier embodiment is that PS service control signaling provided by the PS access network 32 is used for service control signaling instead of CS access control signaling provided by the CS access network 14. The CS bearer control signaling, PS service control signaling, and remote session signaling are anchored in the IMS 12 at the ICCF 26.

The CS bearer control signaling is used to set up, release, and otherwise control the CS bearer path that extends between the user element 16 and the media gateway 22. The PS service control signaling is associated with the CS portion of the IMS session and is used to control the IMS session via the PS access network 32 to provide IMS services. As such, the PS access network 32 is used as the vehicle for providing IMS session control, even though the IMS session is using a CS bearer path. The remote session signaling is associated with the portion of the IMS session that extends from the IMS 12 toward the remote user element 20 and is used to control the remote end of the IMS session to provide IMS services.

As above, the CS bearer control signaling path for the CS bearer control signaling extends between the user element 16 or VMSC 18 and ICCF 26 through the MGCF 24 and at least one CSCF 28. Through the CS bearer control signaling path, the user element 16, VMSC 18, MGCF 24 and the ICCF 26 may communicate with each other to establish, release, and otherwise control the CS bearer path. The PS service control signaling channel extends through the PS access network 32 and into the ICCF 26 via the CSCF 28 of the IMS 12. The ability to communicate over the PS access network 32 allows the user element 16 to directly support IMS signaling, and thus, communicate directly with entities in the IMS 12. As such, the PS service control signaling channel extends from the user element 16 to the ICCF 26 via the CSCF 28 without traversing an adaptation function, such as the CAAF that was provided for the earlier embodiment.

The ICCF 26 continues to anchor the CS bearer control signaling path, the PS service control signaling channel, and the remote session signaling path, which extends through the IMS 12 toward the remote user element 20. The ICCF 26 provides a remote user agent that acts on behalf of the user element 16 and represents the user element 16 as an IMS entity to the remote user element 20. In providing the remote user agent for the user element 16, the ICCF 26 may effectively combine the PS service control signaling and the CS bearer control signaling of the user element 16 and present standard IMS session signaling toward the remote user element 20 via the remote session signaling path. The ICCF 26 may receive IMS session signaling from the remote user element 20 (or user agent thereof) and provide appropriate CS service control signaling and CS bearer control signaling through the CS access network 14. Again, the PS service control signaling channel and the CS bearer control signaling path represent the access legs, while the remote signaling path represents a remote leg for IMS signaling. These legs are interworked with the B2BUA.

In IMS environments, public service identities (PSIs) are used to identify services instead of users. Services provided by application servers 30, including the ICCF 26, are identified with corresponding PSIs. PSIs may take the form of uniform resource identifiers (URIs), directory numbers (DNs), or other information associated therewith and used to identify a desired service. Within a CS access network, a PSI may be or be represented by a directory number. Within the IMS 12 or PS access network 32, the PSI may be or be represented by a URI. For example, an application provided by the ICCF 26 may be associated with a PSI, and an appropriate PSI URI or PSI DN may be used for routing signaling messages to the ICCF 26.

For the present invention, two new PSIs are defined and used in a unique way to enhance session setup and control. The first PSI is associated with the ICCF 26 and is used for establishing the CS bearer signaling path when an IMS session is initiated. The CS bearer signaling path will support the necessary signaling for establishing the CS bearer path via the CS access network 14. The second PSI is also associated with the ICCF 26 and is used for establishing a PS or CS service control signaling channel after establishing the IMS session. For convenience, the first PSI is referred to as a setup PSI, while the second PSI is referred to as an augmentation PSI.

One or both of the setup and augmentation PSIs may be provisioned in the user element 16, obtained by the user element 16 during registration with the IMS 12, obtained by the user element 16, VMSC 18, or other service node dynamically, or the like. After understanding the concepts of the present invention, those skilled in the art may recognize other ways of providing the PSIs to the user element 16 or associated service node.

With reference to FIGS. 3A and 3B, a communication flow is provided to illustrate the use of a setup PSI when a PS service control signaling channel is established at session setup. The communication flow corresponds to the environment illustrated in FIG. 2. In this flow, the setup PSI in the form of a PSI DN that is associated with the ICCF 26 is provided to the user element 16 via a PS service control signaling channel. Assume user element 16 is initiating a session to the remote user element 20. User element 16 is referenced as "A" and the remote user element 20 is referenced as "B" in messages within the flow. Upon session initiation, the user element 16 (A) sets up a PS service control signaling channel into the IMS 12 by initiating a standard IMS origination session toward the remote user element 20 (B). In this example, the session is initiated by sending a SIP invite toward the (S-)CSCF 28 that is serving the user element 16 (A) in the IMS 12 (Step 100). The Invite may indicate that a CS bearer path will used for the session. Preferably, the IMS 12 is the home IMS of the user element 16 (A). The CSCF 28 will process the Invite and route the Invite to the ICCF 26 based on initial filter criteria (Step 102). As such, the ICCF 26 is the first application server inserted into the overall session signaling path.

The ICCF 26 may allocate a setup PSI in the form of a setup PSI DN (Step 104) and provide a response including the setup PSI DN to the CSCF 28 (Step 106), which will forward the response to the user element 16 (A) via the PS service control signaling channel (Step 108). Notably, the ICCF 26 will associate the setup PSI DN with the session being initiated from user element 16 (A) to the remote user element 20 (B). The user element 16 (A) will store the setup PDI DN (step 110) and proceed to initiate the CS bearer control signaling path using the setup PSI DN. The messages in the CS bearer control signaling path are in bold font.

Using the setup PSI DN, the user element 16 (A) will initiate a call using CS call origination procedures by sending a call setup message to the VMSC 18 (Step 112). The VMSC 18 will respond with a call proceeding message (Step 114) and begin to set up the CS bearer control signaling path. The VMSC 18 will send an Integrated Services User Part (ISUP) Initial Address Message (IAM) using the setup PSI DN to the media gateway control function 24 (Step 116), which interworks the IAM into a corresponding Invite with the request URI set to a setup PSI URI corresponding the to setup PSI DN. The Invite will also include the session protocol description (SDP) for the media gateway 22. The media gateway control function 24 will send the Invite toward the CSCF 28 (Step 118), which will process the Invite using the originating initial filter criteria and send the Invite to the ICCF 26 (Step 120).

Upon receiving the Invite, the ICCF 26 will invoke a B2BUA for the access and remote legs (Step 122). Depending on the embodiment, the ICCF 26 may correlate the CS bearer control signaling with the PS service control signaling to provide composite information that is representative of the user element 16 (A) toward the remote user element 20 (B). The ICCF 26 will generate an Invite to route the session toward the remote user element 20 (B). The Invite is directed to the remote user element 20 (B) and includes the SDP information for the CS bearer path, and in particular the SDP information for the media gateway 22 (MGW SDP). After the Invite is generated, the ICCF 26 will send the Invite to the CSCF 28 (Step 124), which will invoke any necessary application servicers 30 (not shown) and forward the Invite toward remote user element 20 (B) (Step 126). Upon completion of the signaling and bearer setup procedures (Step 128) a bearer path for the IMS session is established (Step 130). The bearer path includes a CS bearer portion that extends between the media gateway 22 and the user element 16 (A) via the VMSC 18, and an IMS bearer portion that extends between the media gateway 22 and the remote user element 20 (B) or a user agent thereof.

With reference to FIGS. 4A and 4B, a communication flow is provided to illustrate the use of a setup PSI when a CS service control signaling channel is established at session setup. The communication flow corresponds to the environment illustrated in FIG. 1. In this flow, the setup PSI in the form of a PSI DN that is associated with the ICCF 26 is provided to the user element 16 via a CS service control signaling channel. As above, assume user element 16 (A) is initiating a session to the remote user element 20 (B). Upon session initiation, the user element 16 (A) employs the CS service control signaling channel to send information sufficient to initiate the session into the ICCF 26 via the VMSC 18 (Steps 200 and 202). In one embodiment, the information is sufficient to generate a SIP Invite request intended for the remote user element 20 (B) and is sent via a USSD channel, which provides the CS service control signaling channel. In this example, the ICCF 26 provides a CAAF function that converts the information received from the user element 16 into an Invite, which can be processed by the ICCF 26 in normal fashion. The Invite may indicate that a CS bearer path will be used for the session.

In response to the Invite, the ICCF 26 may allocate a setup PSI in the form of a setup PSI DN (Step 204) and provide a response including the setup PSI DN to the user element 16 (A) over the CS service control signaling channel through the VMSC 18 (Steps 206 and 208). The ICCF 26 will associate the setup PSI DN with the session being initiated from user element 16 (A) to the remote user element 20 (B). The user element 16 (A) will store the setup PSI DN (step 210) and proceed to initiate the CS bearer control signaling path using the setup PSI DN. The messages in the CS bearer control signaling path are in bold font.

Using the setup PSI DN, the user element 16 will initiate a call using CS call origination procedures by sending a call setup message to the VMSC 18 (Step 212). The VMSC 18 will respond with a call proceeding message (Step 214) and begin to set up the CS bearer control signaling path. The VMSC 18 will send an ISUP IAM using the setup PSI DN to the media gateway control function 24 (Step 216), which interworks the IAM into a corresponding Invite with the request URI set to a setup PSI URI corresponding the to setup PSI DN. The Invite will also include the SDP for the media gateway 22. The media gateway control function 24 will send the Invite toward the (S-)CSCF 28 (Step 218), which will process the Invite using the originating initial filter criteria and send the Invite to the ICCF 26 (Step 220).

Upon receiving the Invite, the ICCF 26 will invoke a B2BUA for the access and remote legs (Step 222). Depending on the embodiment, the ICCF 26 may correlate the CS bearer control signaling with the PS service control signaling to provide composite information that is representative of the user element 16 (A) toward the remote user element 20 (B). The ICCF 26 will generate an Invite to route the session toward the remote user element 20 (B). The Invite is directed to the remote user element 20 (B) and includes the SDP information for the CS bearer path, and in particular the SDP information for the media gateway 22 (MGW SDP). After the Invite is generated, the ICCF 26 will send the Invite to the CSCF 28 (Step 224), which will invoke any necessary application servers 30 (not shown) and forward the Invite toward remote user element 20 (B) (Step 226). Upon completion of the signaling and bearer setup procedures (Step 228) a bearer path for the IMS session is established (Step 230). The bearer path includes a CS bearer portion that extends between the media gateway 22 and the user element 16 (A) via the VMSC 18, and an IMS bearer portion that extends between the media gateway 22 and the remote user element 20 (B) or a user agent thereof.

Turning now to FIGS. 5A through 5C, a communication flow is provided to illustrate the use of the setup PSI to initiate an IMS session that is supported in part by a CS bearer path, and the use of the augmentation PSI to add a PS service control signaling channel for the IMS session well after the IMS session has been established. The communication flow corresponds to the IMS environment illustrated in FIG. 2. The addition of the PS service control signaling channel allows IMS services to be provided for the current and subsequent IMS sessions involving the user element 16, even though a portion of the bearer path is provided via the CS access network 14. In this flow, the setup PSI is dynamically allocated when the first IMS session is initiated. The augmentation PSI may have been allocated to the user element 16 (A) during network registration, an initial provisioning process, or the like.

Assume user element 16 (A) is initiating a session to the remote user element 20 (B). Upon session initiation, the user element 16 (A) will generate a CS call setup message including a DN associated with the remote user element 20 (B). This DN is referenced as "B's DN" in the communication flow. Using CS call origination procedures, the user element 16 will send the call setup message to the VMSC 18 (Step 300). Exemplary call origination procedures are set forth in 3GPP TS 24.008, which is incorporated herein by reference. The VMSC 18 will process the call setup message, and based on IN triggers, determine that it needs to obtain an IP Multimedia Routing Number (IMRN) from the IMS 12 (Step 302). For example, the IN triggers may be CAMEL (Customized Application for Mobile network Enhanced Logic) triggers, as provided in GSM networks. The IMRN is a DN that allows the CS bearer control signaling to be routed into the IMS 12 and to the ICCF 26. The CS bearer control signaling path is highlighted in bold. The VMSC 18 will provide a call proceeding message back to the user element 16 (A) (Step 304) and send an IMRN request toward the ICCF 26 (Step 306). The IMRN request will preferably include B's DN. The VMSC 18 may use different direct or indirect mechanisms for communicating with the ICCF 26. As illustrated, a mechanism, such a USSD channel, is provided between the VMSC 18 and the ICCF 26. A CAAF or like adaptation mechanism may provide interworking between the VMSC 18 and the ICCF 26.

The ICCF 26 will receive the IMRN request, store information contained therein, and allocate an IMRN with the setup PSI DN (Step 308). The IMRN may also include an indication that the ICCF should proceed with session setup without waiting for other information received via service control signaling. The indication may be actual or implied in that the ICCF 26 needs to respond to a session being routed into the ICCF 26 using the IMRN by moving forward with session setup without waiting for establishment of a separate (PS or CS) service control path. As such, the IMRN is sufficient to route the CS bearer control signaling through the CS access network 14 into the ICCF 26, and also provides an indication that session setup should proceed without waiting for establishment of a service control signaling channel.

The ICCF 26 will provide a response with the IMRN to the VMSC 18 (Step 310). The VMSC 18 will begin to set up the CS bearer control signaling path by sending an ISUP IAM using the IMRN to the media gateway control function 24 (Step 312), which interworks the IAM into a corresponding Invite with the request URI set to the IMRN. The Invite may also include the SDP for the media gateway 22. The media gateway control function 24 will send the Invite toward the (S-)CSCF 28 (Step 314), which will process the Invite using the originating initial filter criteria and send the Invite to the ICCF 26 (Step 316).

Upon receiving the Invite, the ICCF 26 will invoke a B2BUA for the access and remote legs and initiate the remote leg without waiting on other information from service control signaling (Step 318). The decision to proceed without service control signaling or establishment of a PS or CS service control signaling channel may be based on the IMRN or an indication provided in the IMRN, depending on the configuration of the IMRN. If the ICCF 26 provided indicium in the IMRN when it was allocated, the indicium is analyzed to make the decision. Otherwise, the ICCF 26 may recognize the IMRN as one corresponding to an IMS session that should proceed without service control signaling or an associated service control signaling channel being established. Since the IMS session should proceed without a service control signaling channel, the access leg only includes the CS bearer control path, which was just established. As will be described further below, a (PS or CS) service control signaling channel may be added as an access leg for the IMS session and handled by the B2BUA after the end-to-end session signaling and bearers are completely established and when IMS services are required.

Proceeding without a service control signaling channel, the ICCF 26 will generate an Invite to route the session toward the remote user element 20 (B) to initiate the remote leg. The Invite is directed to the remote user element 20 (B) and includes the SDP information for the CS bearer path, and in particular the SDP information for the media gateway 22 (MGW SDP). After the Invite is generated, the ICCF 26 will send the Invite to the CSCF 28 (Step 320), which will invoke any necessary application servers 30 (not shown) and forward the Invite toward remote user element 20 (B) (Step 322). Upon completion of the signaling and bearer setup procedures (Step 324) a bearer path for the IMS session is established (Step 326). The bearer path includes a CS bearer portion that extends between the media gateway 22 and the user element 16 (A) via the VMSC 18, and an IMS bearer portion that extends between the media gateway 22 and the remote user element 20 (B) or a user agent thereof.

At this time, the IMS session does not have a PS or CS service control signaling channel for the requisite service control signaling required to provide IMS services into the CS access network 14. The IMS session is generally only capable of facilitating full-duplex voice communications, and the ICCF 26 is not capable of providing most, if not all, centralized IMS services. To support centralized IMS services, a PS or CS service control signaling channel must be added to the existing IMS session. In this embodiment, a PS service control signaling channel will be established for service control signaling. The user element 16 (A) employs the augmentation PSI, which is different than the setup PSI embodied in the IMRN. Again, the augmentation PSI identifies the ICCF 26 and will allow signaling messages to be directed to the ICCF 26.

At some point during the IMS session, assume that an associated user instructs user element 16 (A) to invoke an IMS service (Step 328). The service may be any type of IMS service, such as hold call, resume call, or the like. As illustrated, the invoked IMS service is a "hold" service, which is configured to place the existing call on hold. To request the IMS service, the user element 16 (A) generates an Invite with the request URI set to the augmentation PSI along with instructions to hold the current IMS session. The hold instructions may be provided by including "held" SDP information in the Invite. Notably, routing the Invite into the IMS 12 initiates establishment of a service control signaling channel. In this embodiment, the user element 16 (A) has access to the PS access network 32 in addition to the CS access network 14, and as such, delivers the Invite to the (S-)CSCF 28 via the PS access network 32 (Step 330). Based on initial filter criteria, the CSCF 28 will forward the Invite to the ICCF 26 for processing (Step 332).

The ICCF 26 will recognize receipt of an Invite with the augmentation PSI as a request to modify the IMS session, which was previously established using the associated setup PSI (Step 334). The ICCF 26 will identify the IMS session to be modified and update the B2BUA with the PS service control path (Step 336). As such, the PS service control path and the CS bearer control signaling path are correlated to provide composite information that is representative of the user element 16 (A) toward the remote user element 20 (B). The ICCF 26 will next take steps necessary to modify the IMS session based on the service request (Step 338). In this example, placing the initial IMS session on hold may entail delivering a Re-Invite that indicates the IMS session is to be held along the remote leg toward the remote user element 20 (B). In particular, the SDP of the Re-Invite may include "held" SDP information and be sent to the CSCF 28 (Step 340), which will send the Re-Invite along the remote leg toward the remote user element 20 (B). After completion of any requisite signaling, the IMS session between user element 16 (A) and remote user element 20 (B) is held (Step 344).

After the IMS session is held, assume that the associated user instructs user element 16 (A) to invoke an IMS service to initiate a new session with another remote user element 20 (C) (Step 346). Since a CS bearer path is already established and under the control of the ICCF 26, the CS bearer path can be reused for the new IMS session with remote user element 20 (C). A new IMS bearer path will need to be established and interworked with the existing CS bearer path to provide the overall bearer path for the new IMS session.

For initiating the new IMS session with the remote user element 20 (C), the user element 16 (A) can use the previously established PS service control signaling channel for service control signaling. Use of additional CS bearer control signaling is unnecessary. The new IMS session is initiated by sending an Invite with the request URI set to the address of the remote user element 20 (C) (Step 348). The invite is sent to the (S-)CSCF 28 (Step 348), which based on initial filter criteria, will forward the Invite to the ICCF 26 for processing (Step 350). The ICCF 26 will invoke a B2BUA for the new session and initiate the remote leg toward the remote user element 20 (C). The B2BUA will correlate the existing PS service control signaling channel and CS bearer control signaling path to provide composite information that is representative of the user element 16 (A) toward the remote user element 20 (C).

To route the new IMS session to the remote user element 20 (C), the ICCF 26 will send an Invite with the request URI set to the URI of the remote user element 20 (C) and including the media gateway's SDP information toward the remote user element 20 (C). The Invite is received by the CSCF 28 (Step 354), which will forward the Invite toward the user element 20 (C) along the remote leg (Step 356). After completion of the requisite session and bearer setup procedures (Step 358), the bearer path for the new IMS session is established (Step 360). The bearer path includes a previously established CS bearer portion that extends between the media gateway 22 and the user element 16 (A) via the VMSC 18 and a new IMS bearer portion that extends between the media gateway 22 and the remote user element 20 (C) or a user agent thereof.

Turning now to FIGS. 6A through 6C, a communication flow is provided to illustrate the use of the setup PSI to initiate an IMS session that is supported in part by a CS bearer path and the use of the augmentation PSI to add a CS service control signaling channel for the IMS session well after the IMS session has been established. The previous communication flow of FIGS. 5A through 5C employed a PS service control signaling channel. The current communication flow corresponds to the IMS environment illustrated in FIG. 1. The addition of the CS service control signaling channel allows IMS services to be provided for the current and subsequent IMS sessions involving the user element 16, even though a portion of the bearer path is provided via the CS access network 14. As in the prior flow, the setup PSI is dynamically allocated when the first IMS session is initiated. Again, the augmentation PSI may have been allocated to the user element 16 (A) during network registration, an initial provisioning process, or the like.

Assume user element 16 (A) is initiating a session to the remote user element 20 (B). Upon session initiation, the user element 16 (A) will generate a CS call setup message including user B's DN, which is associated with the remote user element 20 (B). Using CS call origination procedures, the user element 16 will send the call setup message to the VMSC 18 (Step 400). The VMSC 18 will process the call setup message, and based on IN triggers, determine that it needs to obtain an IMRN from the IMS 12 (Step 402) to allow the CS bearer control signaling to be routed to the ICCF 26. The CS bearer control signaling path is highlighted in bold. Accordingly, the VMSC 18 will provide a call proceeding message back to the user element 16 (A) (Step 404) and send an IMRN request toward the ICCF 26 (Step 406). The IMRN request will preferably include B's DN. In this embodiment, the VMSC 18 employs a CS signaling mechanism, such as USSD, for communicating with the ICCF 26. As illustrated, a USSD channel is provided between the VMSC 18 and the ICCF 26. A CAAF or like adaptation mechanism may provide interworking between the VMSC 18 and the ICCF 26.

The ICCF 26 will receive the IMRN request, store information contained therein, and allocate an IMRN with the setup PSI DN (Step 408). The IMRN is sufficient to route the CS bearer control signaling through the CS access network 14 into the ICCF 26, and also provides a direct or indirect indication that session setup should proceed without waiting for establishment of a service control signaling channel. The ICCF 26 will provide a response with the IMRN to the VMSC 18 (Step 410). The VMSC 18 will begin to set up the CS bearer control signaling path by sending an ISUP IAM using the IMRN to the media gateway control function 24 (Step 412), which interworks the IAM into a corresponding Invite with the request URI set to the IMRN. The Invite may also include the SDP for the media gateway 22. The media gateway control function 24 will send the Invite toward the (S-)CSCF 28 (Step 414), which will process the Invite using the originating initial filter criteria and send the Invite to the ICCF 26 (Step 416).

Upon receiving the Invite, the ICCF 26 will invoke a B2BUA for the access and remote legs and initiate the remote leg without waiting on other information from service control signaling (Step 418). Again, the decision to proceed without service control signaling or establishment of a PS or CS service control signaling channel may be based on the IMRN or an indication provided in the IMRN, depending on the configuration of the IMRN. If the ICCF 26 provided indicium in the IMRN when it was allocated, the indicium is analyzed to make the decision. Otherwise, the ICCF 26 may recognize the IMRN as one corresponding to an IMS session that should proceed without service control signaling or an associated service control signaling channel being established. Since the IMS session should proceed without a service control signaling channel, the access leg only includes the CS bearer control path, which was just established. As will be described further below, a (PS or CS) service control signaling channel may be added as an access leg for the IMS session and handled by the B2BUA after the end-to-end session signaling and bearers are completely established and when IMS services are required.

Proceeding without a service control signaling channel, the ICCF 26 will generate an Invite to route the session toward the remote user element 20 (B) to initiate the remote leg. The Invite is directed to the remote user element 20 (B) and includes the SDP information for the CS bearer path, and in particular the SDP information for the media gateway 22 (MGW SDP). After the Invite is generated, the ICCF 26 will send the Invite to the CSCF 28 (Step 420), which will invoke any necessary application servers 30 (not shown) and forward the Invite toward remote user element 20 (B) (Step 422). Upon completion of the signaling and bearer setup procedures (Step 424) a bearer path for the IMS session is established (Step 426). The bearer path includes a CS bearer portion that extends between the media gateway 22 and the user element 16 (A) via the VMSC 18, and an IMS bearer portion that extends between the media gateway 22 and the remote user element 20 (B) or a user agent thereof.

At this time the IMS session does not have a PS or CS service control signaling channel for the requisite service control signaling required to provide IMS services into the CS access network 14. The IMS session is generally only capable of facilitating full-duplex voice communications, and the ICCF 26 is not capable of providing most, if not all, centralized IMS services. To support centralized IMS services, a PS or CS service control signaling channel must be added to the existing IMS session. In this embodiment, a CS service control signaling channel will be established for service control signaling. The user element 16 (A) employs the augmentation PSI, which is different than the setup PSI embodied in the IMRN. Again, the augmentation PSI identifies the ICCF 26 and will allow signaling messages to be directed to the ICCF 26.

At some point during the IMS session, assume that an associated user instructs user element 16 (A) to invoke an IMS service (Step 428). As illustrated, the invoked IMS service is a "hold" service, which is configured to place the existing call on hold. To request the IMS service, the user element 16 (A) generates information sufficient to form an Invite with the request URI set to the augmentation PSI, and includes instructions to hold the current IMS session. As illustrated, the hold instructions are provided by including "held" SDP information for the Invite. In this embodiment, the user element 16 (A) does not have access to the PS access network 32 in addition to the CS access network 14, and as such, will use a CS signaling mechanism of the CS access network 14. As illustrated, USSD is used to communicate with the ICCF 26, which may provide a CAAF to interwork the USSD messages with SIP messages. A USSD message is used to deliver the information, including the augmentation PSI and the held SDP, for the Invite to the ICCF 26. The USSD message is delivered to the VMSC 28 (Step 430), which sends the USSD message toward the ICCF 26 along a CS service control signaling channel (Step 432). A CAAF will process the information in the USSD message and generate a corresponding Invite, wherein the request URI is set to the augmentation PSI and the SDP information indicates the IMS session should be held.

The ICCF 26 will recognize receipt from the CAAF of an Invite with the augmentation PSI as a request to modify the IMS session, which was previously established using the associated setup PSI (Step 434). The ICCF 26 will identify the IMS session to be modified and update the B2BUA with the CS service control path (Step 436). As such, the CS service control path and the CS bearer control signaling path are correlated to provide composite information that is representative of the user element 16 (A) toward the remote user element 20 (B). The ICCF 26 will next take steps necessary to modify the IMS session based on the service request (Step 438). In this example, placing the initial IMS session on hold may entail delivering a Re-Invite that indicates the IMS session is to be held along the remote leg toward the remote user element 20 (B). In particular, the SDP of the Re-Invite may include "held" SDP information and be sent to the CSCF 28 (Step 440), which will send the Re-Invite along the remote leg toward the remote user element 20 (B) (Step 442). After completion of any requisite signaling, the IMS session between user element 16 (A) and remote user element 20 (B) is held (Step 444).

Once the IMS session is held, assume that the associated user instructs user element 16 (A) to invoke an IMS service to initiate a new session with another remote user element 20 (C) (Step 446). Since a CS bearer path is already established and under the control of the ICCF 26, the CS bearer path can be reused for the new IMS session with remote user element 20 (C). A new IMS bearer path will need to be established and interworked with the existing CS bearer path to provide the overall bearer path for the new IMS session.

For initiating the new IMS session with the remote user element 20 (C), the user element 16 (A) can use the previously established CS service control signaling channel for service control signaling. As illustrated, the CS service control signaling channel is provided via a USSD mechanism, and as such, USSD is used to communicate with the ICCF 26. The ICCF 26 again uses the CAAF to interwork the USSD messages with SIP messages, and a USSD message is used to deliver the information for an appropriate Invite to the ICCF 26. The information in the USSD message will identify a DN or URI for remote user element 20 (C) and any other information necessary for the CAAF to create a corresponding Invite. The USSD message is delivered to the VMSC 18 (Step 448), which sends the USSD message toward the ICCF 26 along a CS service control signaling channel (Step 450). A CAAF will process the information in the USSD message and generate a corresponding Invite, wherein the request URI is set to the URI associated with the remote user element 20 (C). The ICCF 26 will invoke a B2BUA for the new session and initiate the remote leg toward the remote user element 20 (C) (Step 452). The B2BUA will correlate the existing CS service control signaling channel and CS bearer control signaling path to provide composite information that is representative of the user element 16 (A) toward the remote user element 20 (C).

To route the new IMS session to the remote user element 20 (C), the ICCF 26 will send an Invite including the media gateway's SDP information toward the remote user element 20 (C). The Invite is received by the CSCF 28 (Step 454), which will forward the Invite toward the user element 20 (C) along the remote leg (Step 456). After completion of the requisite session and bearer setup procedures (Step 458), the bearer path for the new IMS session is established (Step 460). The bearer path includes previously established CS bearer portion that extends between the media gateway 22 and the user element 16 (A) via the VMSC 18, and a new IMS bearer portion that extends between the media gateway 22 and the remote user element 20 (C) or a user agent thereof.

Prior to the present invention, the establishment and correlation of the PS or CS service control signaling with the CS bearer control signaling by the ICCF 26 was often time consuming and tended to slow down initial setup of the IMS session. In many cases, establishment of the IMS session is delayed and the delay is potentially annoying or confusing to users. For many sessions that are merely voice calls, IMS services are not needed and correlation of the PS or CS service control signaling with the CS bearer control signaling is essentially unnecessary. In other instances, IMS services are not invoked until well after the IMS session is established. With the present invention, the delay in correlating the PS or CS service control signaling with the CS bearer control signaling is avoided, and if IMS services are requested after the IMS session is established a service control signaling channel that supports service control signaling can be readily established to provide the requested IMS services.

With reference to FIG. 7, a service node 34 capable of providing one or more IMS functions, such as the ICCF 26, CSCF 28, Application Server 30, CAAF, or the like, is provided according to one embodiment of the present invention. The service node 34 may reside in the IMS 12 and include a control system 36 and associated memory 38 to provide the functionality for any one or a combination of IMS functions. The control system 36 will also be associated with a communication interface 40 to facilitate communications with entities affiliated with the IMS 12 or appropriately associated networks.

With reference to FIG. 8, a block representation of a user element 16 is provided. The user element 16 may include a control system 42 having sufficient memory 44 to support operation of a CS client 46 and a PS client 48. The user element 16 uses the CS client 46 and an the PS client 48 to support circuit-switched communications via the CS access network 14 as well as packet communications via the PS access network 32, respectively. The control system 50 will be associated with a communication interface 50 to facilitate wired or wireless communications over various access networks. The control system 42 may also be associated with a user interface 52, which will facilitate interaction with the user. The user interface 52 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method of operating an Internet Protocol based multimedia subsystem (IMS) comprising:
    establishing a first IMS session between a first user element and a second user element, the first IMS session having:
        at least a portion of an overall bearer path being a circuit-switched (CS) bearer path that extends through a CS access network to the first user element; and
        a remote signaling leg that extends from the IMS toward the second user element;
    after the first IMS session is established, establishing an initial service control signaling channel for the first IMS session, wherein the service control signaling channel is for providing IMS services for the first user element, the service control channel extending from the IMS toward the first user element;
    associating the service control signaling channel with the remote signaling leg; and
    providing an IMS service for the first IMS session to the first user element via the service control signaling channel and to the second user element via the remote signaling leg.

2. The method of claim 1 wherein the service control signaling channel is established via the CS access network.

3. The method of claim 2 wherein the service control signaling channel is provided at least in part via an Unstructured Supplementary Service Data signaling mechanism.

4. The method of claim 1 wherein the service control signaling channel is established via a packet-switched (PS) access network.

5. The method of claim 1 wherein the first IMS session is established using a setup public subscriber identity (PSI) and the service control signaling channel is established using an augmentation PSI.

6. The method of claim 1 further comprising receiving a message indicative of a request from the first user element to establish the service control signaling channel, wherein the service control signaling channel is established in response to receiving the message.

7. The method of claim 6 wherein the request from the first user element to establish the service control signaling channel is a request to invoke the IMS service.

8. The method of claim 6 wherein the request comprises an augmentation identifier that instructs the IMS to establish the service control signaling channel and associate the service control signaling channel with the remote signaling leg.

9. The method of claim 8 wherein the augmentation identifier is an augmentation public subscriber identity (PSI) that identifies a service provided in the IMS and operating to control the first IMS session.

10. The method of claim 9 wherein the first IMS session is established using a setup PSI that is different from the augmentation PSI.

11. The method of claim 1 wherein prior to establishment of the service control signaling channel, the first IMS session supports communications between the first user element and the second user element, and the IMS service cannot be provided for the first IMS session without the service control signaling channel.

12. The method of claim 11 wherein the first IMS session supports full-duplex voice communications prior to establishment of the service control signaling channel.

13. The method of claim 1 wherein facilitating establishment of the service control signaling channel comprises receiving via a signaling mechanism a message indicative of a request from the first user element to establish the service control signaling channel, and providing service control signaling toward the first user element via the signaling mechanism.

14. The method of claim 1 wherein establishing the first IMS session between the first user element and the second user element comprises:
    establishing the CS bearer path in the CS access network using CS bearer control signaling provided over a CS bearer control signaling path in the CS access network;
    establishing the remote signaling leg; and
    associating the CS bearer control signaling path with the remote signaling leg.

15. The method of claim 14 wherein the CS bearer control signaling path and the service control signaling path are combined and presented toward the second user element via the remote leg on behalf of the first user element to facilitate signaling for the first IMS session.

16. The method of claim 14 further comprising:
    receiving a routing number request from an entity in the CS access network in association with initiating the first IMS session;
    allocating a routing number associated with a setup public subscriber identity (PSI) that identifies a service in the IMS; and
    receiving a message via the CS bearer control signaling path wherein the message is routed toward the service using the routing number, and the CS bearer control signaling path is established in response to routing the message toward the service.

17. The method of claim 16 wherein facilitating establishment of the service control signaling channel comprises receiving via a signaling mechanism a message comprising an augmentation PSI, which is indicative of a request from the first user element to establish the service control signaling channel.

18. The method of claim 1 wherein the overall bearer path comprises a packet bearer path that is interworked with the CS bearer path.

19. The method of claim 1 further comprising:
    establishing a second session between the first user element and a third user element, the second session having at least a portion of a second overall bearer path being the circuit-switched (CS) bearer path and a second remote signaling leg that extends from the IMS toward the third user element; and providing an IMS service for the second session to the first user element via the service control signaling channel and to the third user element via the second remote signaling leg.

20. A service node providing a service in an Internet Protocol based multimedia subsystem (IMS) comprising: at least one communication interface; and a control system associated with the at least one communication interface and configured to:

establish a first IMS session between a first user element and a second user element, the first IMS session having:

at least a portion of an overall bearer path being a circuit-switched (CS) bearer path that extends through a CS access network to the first user element; and a remote signaling leg that extends from the IMS toward the second user element;

after the first IMS session is established, establish an initial service control signaling channel for the first IMS session, wherein the service control signaling channel is for providing IMS services for the first user element, the service control channel extending from the IMS toward the first user element;

associate the service control signaling channel with the remote signaling leg; and provide an IMS service for the first IMS session to the first user element via the service control signaling channel and to the second user element via the remote signaling leg.

21. The service node of claim 20 wherein the service control signaling channel is established via the CS access network.

22. The service node of claim 20 wherein the service control signaling channel is established via a packet-switched (PS) access network.

23. The service node of claim 20 wherein the first IMS session is established using a setup public subscriber identity (PSI) and the service control signaling channel is established using an augmentation PSI.

24. The service node of claim 20 wherein the control system is further configured to receive a message indicative of a request from the first user element to establish the service control signaling channel, wherein the service control signaling channel is established in response to receiving the message.

25. The service node of claim 24 wherein the request from the first user element to establish the service control signaling channel is a request to invoke the IMS service.

26. The service node of claim 24 wherein the request comprises an augmentation identifier that instructs the IMS to establish the service control signaling channel and associate the service control signaling channel with the remote signaling leg.

27. The service node of claim 26 wherein the augmentation identifier is an augmentation public subscriber identity (PSI) that identifies a service provided in the IMS and operating to control the first IMS session.

28. The service node of claim 27 wherein the first IMS session is established using a setup PSI that is different from the augmentation PSI.

29. The service node of claim 20 wherein prior to establishment of the service control signaling channel, the first IMS session supports communications between the first user element and the second user element and the IMS service cannot be provided for the first IMS session without the service control signaling channel.

30. The service node of claim 20 wherein establishing the first IMS session between the first user element and the second user element comprises:

establishing the CS bearer path in the CS access network using CS bearer control signaling provided over a CS bearer control signaling path in the CS access network;

establishing the remote signaling leg; and associating the CS bearer control signaling path with the remote signaling leg.

31. The service node of claim 30 wherein the control system is further configured to: receiving a routing number request from an entity in the CS access network in association with initiating the first IMS session;

allocating a routing number associated with a setup public subscriber identity (PSI) that identifies a service in the IMS; and receiving a message via the CS bearer control signaling path wherein the message is routed toward the service using the routing number, and the CS bearer control signaling path is established in response to routing the message toward the service.

* * * * *